(12) United States Patent
Olsson et al.

(10) Patent No.: US 6,545,704 B1
(45) Date of Patent: Apr. 8, 2003

(54) VIDEO PIPE INSPECTION DISTANCE MEASURING SYSTEM

(75) Inventors: Mark S. Olsson, San Diego, CA (US); David A. Cox, San Diego, CA (US); Bradley D. Barnicoat, San Diego, CA (US)

(73) Assignee: Deep Sea Power & Light, San Diego, CA (US)

( * ) Notice: Subject to any disclaimer, the term of this patent is extended or adjusted under 35 U.S.C. 154(b) by 0 days.

(21) Appl. No.: 09/348,517

(22) Filed: Jul. 7, 1999

(51) Int. Cl.⁷ .............................. H04N 7/18; G01M 3/04
(52) U.S. Cl. ...................................... 348/84; 73/40.5 R
(58) Field of Search .............................. 348/82, 84, 61, 348/85; 73/40.5 R; 242/575.5

(56) References Cited

U.S. PATENT DOCUMENTS

| | | | | |
|---|---|---|---|---|
| 3,712,561 A | * | 1/1973 | Williams ................. | 242/575.5 |
| RE33,160 E | * | 2/1990 | Guthrie et al. ........... | 73/40.5 R |
| 5,084,764 A | * | 1/1992 | Day ............................ | 348/84 |
| 5,754,220 A | * | 5/1998 | Smalser, Sr. ................ | 348/84 |
| 5,903,306 A | * | 5/1999 | Heckendorn et al. ......... | 348/85 |

OTHER PUBLICATIONS 1997, flexiprobe®ELS P371 Portable Video System (p. 1 of four page web site, Copyright 1997, Pearpoint, Inc.).

* cited by examiner

Primary Examiner—Chris Kelley
Assistant Examiner—Allen Wong
(74) Attorney, Agent, or Firm—Michael H. Jester

(57) ABSTRACT

A video pipe inspection system includes a video camera head with an optical sensor connected to a circuit for generating a video image signal representing real time images of scenes in view of the optical sensor. The system further includes a push reel that is rotatably mounted on a support frame. An elongate push cable is normally stored in continuous turns in the push reel. The push cable has a distal end operatively connected to the video camera head and a proximal end operatively connected to a central hub of the push reel. The push cable includes at least one conductor for conveying the video image signal from the camera head. The push cable has a predetermined resiliency and flexibility to permit the push cable to be unwound from the push reel in order to force the camera head a substantial distance down a length of pipe having one or more tight turns. A distance sensing module is mounted to the frame and includes two non-contact sensor pair for detecting an amount and a direction of relative motion of the push reel and for providing a video overlay signal representing a length of push cable that has been pushed into the pipe. An electrical connection is provided between the proximal end of the push cable and the distance sensing module so that the video overlay signal can be joined with video image signal from the camera head to provide an output video signal. The output video signal is transmitted via cable, RF or any other suitable manner to a video display unit that shows real time images of the interior of the pipe along with a visual indication of the length of push cable that has been forced down the pipe.

30 Claims, 20 Drawing Sheets

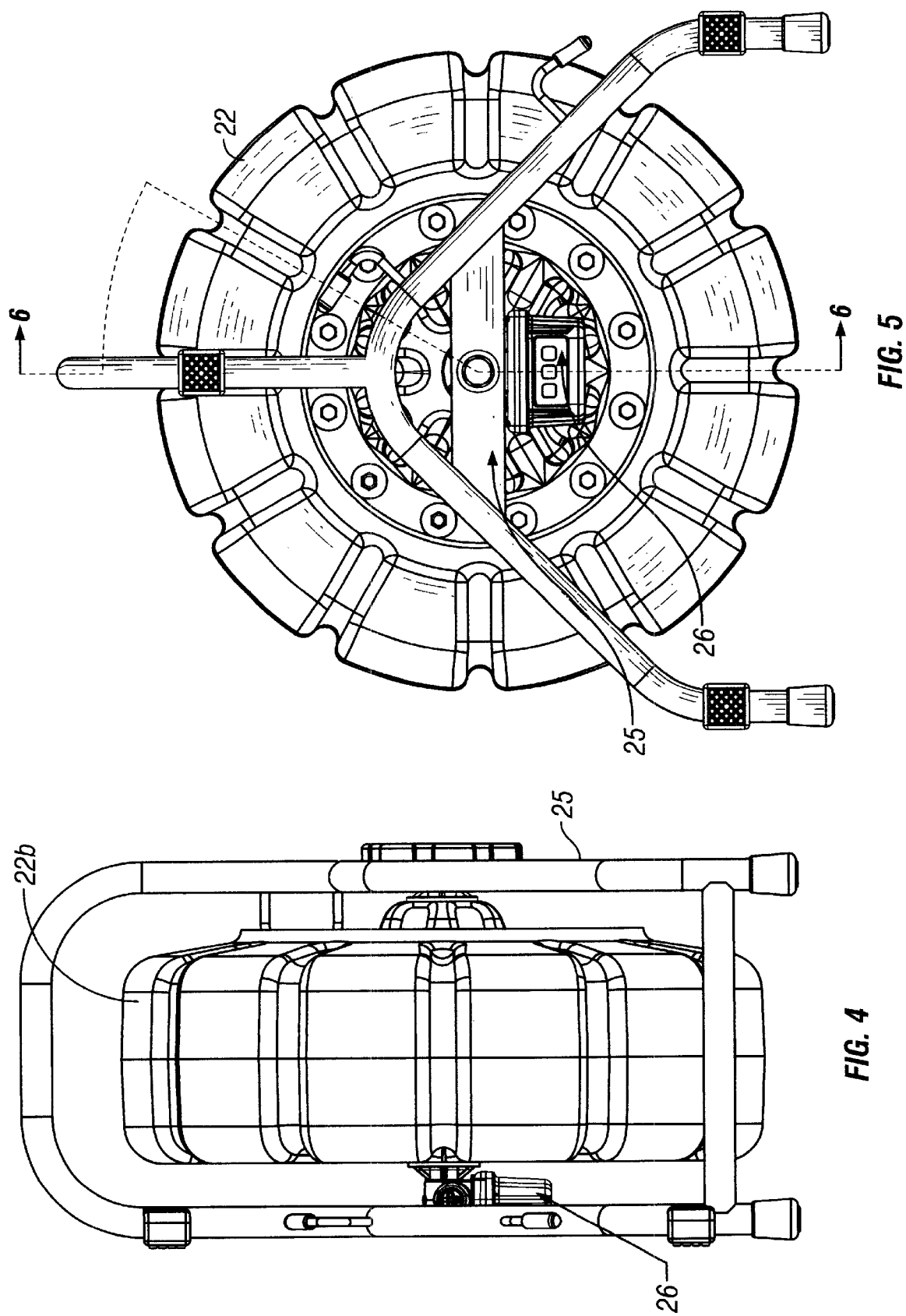

VIDEO PIPE INSPECTION DISTANCE MEASURING SYSTEM

BACKGROUND OF THE INVENTION

The present invention relates to electro-mechanical systems for inspecting the insides of buried pipes and other conduits for defects and obstructions, and more particularly, to a video pipe inspection system with improved distance measuring capabilities.

There are many situations where it is desirable to internally inspect long lengths of pipe which are already in place, either underground, in a building, or underwater. For example, sewer and drain pipes frequently need to be internally inspected to diagnose existing problems or to determine if there are any breaks causing leakage or obstructions impairing the free flow of waste. It is also important to internally inspect steam pipes, heat exchanger pipes, water pipes, gas pipes, electrical conduits and fiber optic conduits for similar reasons. Frequently, pipes which are to be internally inspected have an internal diameter of six inches or less. It is sometimes necessary to inspect several hundred feet of pipe.

Over the years, video pipe inspection systems have been developed which typically include a camera which is forced down the pipe so that its interior can be viewed on a video display. It is common to record the inspection on a video recorder (VCR). Conventional video pipe inspection systems include a push cable which provides an electro-mechanical connection between a rugged head enclosing and protecting the video camera and a rotatable push reel which is used to pay out cable and force the head down the pipe. The push cable must be specially constructed in order to be flexible enough to make tight turns yet rigid enough to be pushed hundreds of feet down small diameter pipe. The push cable must also incorporate electrically conductive or fiber optic cable having the proper impedance for conveying the NTSC or other video signal to the video display unit and additional power and ground conductors. Examples of video push cables are disclosed in U.S. Pat. No. 5,457,288 granted Oct. 10, 1995 to Mark S. Olsson and U.S. Pat. No. 5,808,239 granted Sep. 15, 1998 to Mark S. Olsson.

In a video pipe inspection system it is highly desirable for the user to have accurate information concerning the location of the camera head in the pipe. This is important in establishing the location of the defect or obstruction that must be repaired, e.g. by excavation. The amount of push cable that has been forced down the pipe can be measured and the approximate location of the camera head in the pipe can be determined from this measurement. An electromagnetic/inductive transmitter can also be mounted adjacent the camera head whose output signal can be detected above ground as an additional or alternate means of locating the camera head.

In commercial video pipe inspection systems the amount of push cable that has been payed out from the push reel and forced down the pipe and the amount of push cable that has been withdrawn have been measured in two basic ways. A first approach uses a pair of pinch rollers adjacent the push reel and between which the push cable is fed. The rollers are driven by the movement of the push cable and conventional mechanical or electrical mechanisms provide a visual read out of the length of push cable that has been payed out or pulled in. This approach is cumbersome and subject to problems because the pinch rollers often get fouled by dirt and other debris drawn from the pipe. The pinch rollers can slip or lock up and provide inaccurate distance measurements.

A second approach that has been used commercially to measure the amount of push cable forced down a pipe requires an optical encoder or other device which is mechanically driven by the push reel. The number of rotations of the push reel, along with the direction of rotation of the push reel, provide a measurement of the length of push cable that has been payed out or pulled in from the pipe. Signals from the optical encoder are sent to a processing circuit, usually associated with the video display, where they are processed so that alphanumeric distance information can be simultaneously displayed as an overlay to the real time video image of the interior of the pipe. The optical encoder can fail as a result of the harsh environment in which video pipe inspection systems are frequently used. A video pipe inspection system that has an optical encoder or some other electrical motion sensing device mechanically driven by the push reel requires a special electronic circuit. The controls and user programming of the special electronic circuit are often complex and not user friendly. The output of a video pipe inspection system with a mechanically driven push reel motion sensor cannot typically be plugged into any household TV or VCR. Thus the special distance signal processing unit represents added expense to the end user as well as more equipment to haul between job sites.

SUMMARY OF THE INVENTION

It is therefore the primary object of the present invention to provide a video pipe inspection system with improved distance measuring capabilities.

In accordance with the present invention a video pipe inspection system includes a video camera head with an optical sensor connected to a circuit for generating a video image signal representing real time images of scenes in view of the optical sensor. The system further includes a push reel that is rotatably mounted on a support frame. An elongate push cable is normally stored in continuous turns in the push reel. The push cable has a distal end operatively connected to the video camera head and a proximal end operatively connected to a central hub of the push reel. The push cable includes at least one conductor for conveying the video image signal from the camera head. The push cable has a predetermined resiliency and flexibility to permit the push cable to be unwound from the push reel in order to force the camera head a substantial distance down a length of pipe. A distance sensing module is mounted to the frame and includes two non-contact sensor pairs for detecting an amount and a direction of relative motion of the push reel and for providing a video overlay signal representing a length of the push cable that has been pushed into the pipe. An electrical connection is provided between the proximal end of the push cable and the distance sensing module so that the video overlay signal can be joined with video image signal from the camera head to provide an output video signal. The output video signal is transmitted via cable, RF or any other suitable manner to a video display unit that shows real time images of the interior of the pipe along with a visual indication of the length of push cable that has been forced down the pipe.

The present invention also provides a method of internally inspecting a pipe. The first step of the method involves providing a video camera head including an optical sensor and means for generating a video image signal representing real time images of scenes in view of the optical sensor. The next step of the method calls for connecting the video camera head to a distal end of an elongate push cable having a predetermined resiliency and flexibility to permit the camera head to be forced down a substantial distance of a length of pipe. The next steps of the method require storing the push cable in a plurality of turns in a push reel and mounting the push reel for rotation on a support frame. The next step of the method involves detecting an amount and direction of rotation of the push reel via a distance sensing module mounted on the frame and generating a video overlay signal representing a length of the push cable that has been payed out of and/or reeled into the push reel and forced down the pipe. The next step of the method requires communicating the video image signal from a proximal end of the push cable to the distance sensing module and joining the video image signal and the video overlay signal to provide an output video signal. The final step of the method involves communicating the output video signal to a video display unit and displaying real time images of the inside of the pipe while simultaneously displaying a position of the video camera head inside the pipe representative of the length of the push cable that has been payed out of and/or reeled into the push reel.

BRIEF DESCRIPTION OF THE DRAWINGS

FIG. 4 is an enlarged end elevation view of the push reel and support frame of the system of FIG. 1.

FIG. 5 is an enlarged side elevation view of the push reel and support frame of the system of FIG. 1.

DESCRIPTION OF THE PREFERRED EMBODIMENT

For the sake of brevity, the term "pipe" as used hereafter shall refer to any elongated generally tubular member which can be advantageously inspected internally by a video inspection system having a camera head mounted on the end of a long push cable, including drain pipes, steam pipes, heat exchanger pipes, water pipes, gas pipes, electrical conduits and fiber optic conduits. The pipe may be a single long straight segment or it may be straight segments connected by on or more turns which vary from relatively small radius (tight turns) to relative large radius (wide turns).

Figure 1:
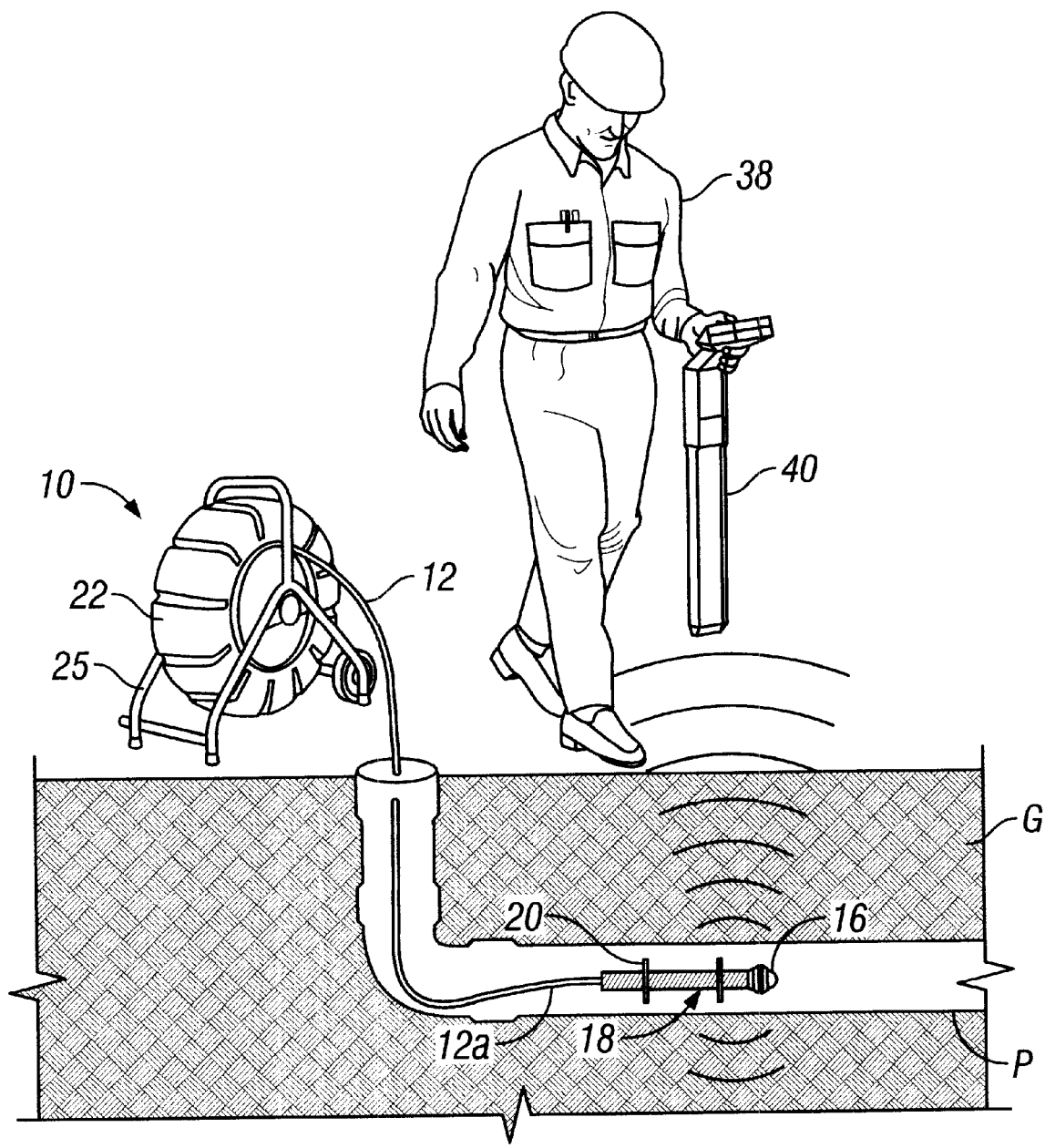
FIG. 1 is a pictorial illustration of a preferred embodiment of the system of the present invention showing its push reel and support frame on the ground, an underground pipe in section with the camera head of the system attached to the distal end of the push cable of the system and located in the pipe, and a worker carrying an instrument for locating the camera head via electromagnetic emissions.

Referring to FIG. 1, a video pipe inspection system 10 includes an elongate, resilient and flexible push cable 12. The forward or distal end 12a of the push cable 12 is operatively connected through an electro-mechanical termination assembly (not visible) to a video camera head 16 which includes a rugged generally cylindrical outer stainless steel housing that encloses an optical sensor such as a charge-coupled device (CCD). The housing of the video camera head 16 may also be made of Aluminum, Titanium, plastic or any other durable material. The video camera head 16 further includes a circuit which receives the output of the CCD and generates a video image signal representing real time images of scenes viewed by the optical sensor through a forward scratch resistant window. By way of example, the window may be made of sapphire crystal. The video camera head 16 may function with video systems employing EIA, NTSC, CCIR, PAL and other standard video signal formats. Further details of the camera head 16 and termination assembly are disclosed in U.S. Pat. No. 5,457,288, the entire disclosure of which is incorporated by reference herein.

A stainless steel coil spring 18 surrounds the push cable 12 and is coupled between the rear end of the video camera head 16 and the termination assembly. The spring 18 could also be plastic with armor or some other suitable material. The spring 18 provides the desirable amount of flexibility to permit the video camera head 16 to negotiate tight turns in a pipe P being internally inspected. The pipe P is buried in the ground G and typically includes at least one turn. Two stainless steel aircraft cables (not shown) connect the video camera head 16 to the termination assembly. The cables extend longitudinally within the spring 18 and limit its extension. This facilitates removal of the video camera head 16 from the pipe P if it were to get stuck.

The video camera head 16 is preferably dimensioned for insertion into pipes having internal diameters as small as two inches. With advancements in video camera miniaturization, the video camera head 16 can be designed to fit within pipes having internal diameters of one inch or less. Built into the forward end of the video camera head 16 are a plurality of red LEDs (not illustrated) which can provide sufficient illumination for red-spectrum sensitive CCDs used in black and white camera systems. White LEDs may be used for a color video camera. In some applications infrared LEDs may be suitable. The video camera head 16 preferably has a fixed focus lens system that provides a wide viewing angle with substantial depth of field, thereby eliminating the need for remote focusing in most applications.

Preferably the video camera head 16 is constructed so that it is waterproof to a depth of at least three hundred and thirty feet and is capable of withstanding pressures of at least one hundred and fifty pounds per square inch (PSI).

Optionally deformable plastic fins 20 (FIG. 1) extend radially from the exterior of the video camera head 16 to centrally position the camera head within the pipe P. The push cable 12 may extend several hundred feet within the pipe P between the termination assembly and a push reel 22. The push reel 22 preferably comprises a plastic annular body roughly similar in shape and size to an automobile tire. The plastic annular body may be formed by any suitable means, such as rotational molding. It has an internal conical central hub portion 22a (FIG. 3) that is bolted to the main annular body portion 22b of the push reel. The push reel 22 is rotatably supported on a horizontal axle 24 whose opposite ends are carried by a support frame 25. The push cable 12 is wound into continuous circular coils or turns inside the annular body portion 22b around the hub portion 22a. Due to its resilience, the coils of the push cable 12 push radially outwardly and are restrained by the annular cylindrical wall of the annular body portion 22b of the push reel 22. Thus the push reel 22 is manually rotatable about a horizontal axis to pay out the push cable 12 from a circular central opening in the push reel 22 opposite the conical hub portion 22a. This forces the video camera head 16 down the pipe P. The push cable 12 must be pulled back out of the pipe P and pushed back inside the push reel 22 to withdraw the camera head 16.

Figure 2:
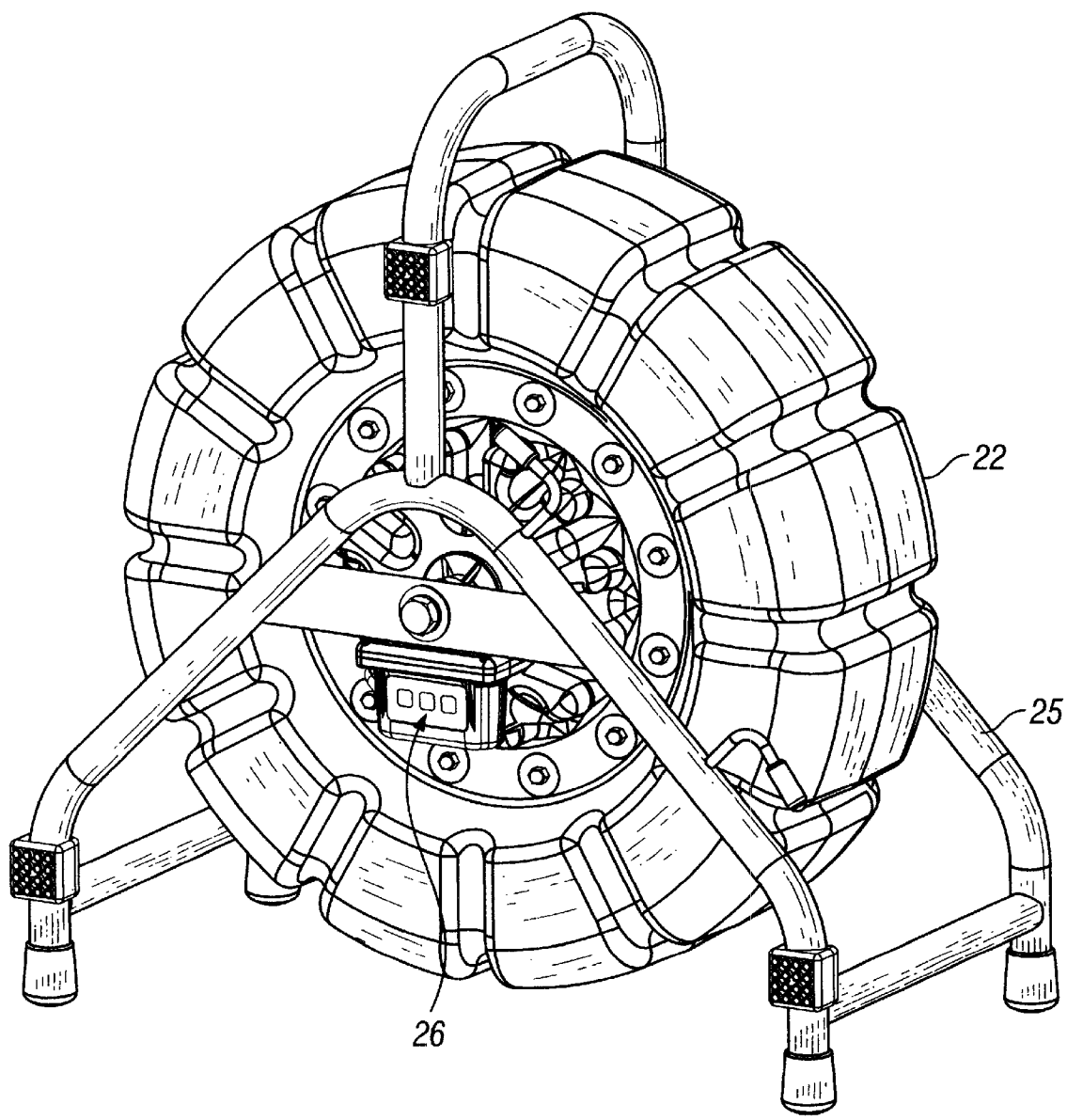
FIG. 2 is an enlarged isometric view of the push reel and support frame of the present invention showing the distance sensing module mounted to the frame.

As used hereafter, the term "push reel" shall refer not only to a tire shaped annular housing for holding turns of the video push cable 12, but in addition, any other type of spool, cage, yoke mandrel, arms, fingers or similar mechanical device for allowing an elongate, resilient, flexible but somewhat stiff push cable to be coiled into multiple turns for transport, while allowing the distal end of the same to be readily payed out. The push reel 22 need not have the tire-like configuration illustrated in FIG. 2.

The push cable 12 has a rearward or proximal end 12b (FIG. 3) operatively connected through the central hub portion 22a of the push reel 22. The push cable 12 includes at least one conductor for conveying the video image signal from the camera head. The push cable 12 has a predetermined resiliency and flexibility to permit the push cable 12 to be unwound from the push reel 22 in order to force the video camera head 16 a substantial distance, i.e. as much as six hundred feet down the length of pipe P. The push cable 12 should be durable and have a minimal outer diameter and weight per unit length to facilitate pushing great lengths of the cable into the pipe. It also preferably matches the seventy-five ohm impedance of most video cameras. One suitable construction for the push cable 12 is disclosed in U.S. Pat. No. 5,808,239 granted Sep. 15, 1998 to Mark S. Olsson and entitled VIDEO PUSH-CABLE, the entire disclosure of which is specifically incorporated herein by reference.

A distance sensing module 26 (FIGS. 2, 3, 4 and 5) is mounted on the inside of a horizontal cross-piece of the support frame 25. It includes two non-contact sensor pairs for detecting the amount and direction of motion of the push reel 22. The distance sensing module 26 also contains a clock, a non-volatile memory for storage of configuration information, a battery and a circuit for generating a video overlay signal representing the length of the push cable 12 inside the pipe P.

A drum termination coupling 27 (FIG. 3) connects the proximal end 12b of the push cable 12 through the central hub portion 22a. A conventional slip ring coupling 28 is mounted inside the central hub portion 22a and is used to provide an electrical connection between one end of a short cable 29 and one end of another short cable 30. The other end of the cable 29 connects through the drum termination coupling 27 to the proximal end 12b of the push cable 12. Thus the coupling 27 and cable 29 can effectively be considered an extension of the proximal end 12b of the push cable 12. The other end of the cable 30 connects to the distance sensing module 26 so that the video overlay signal can be joined with video image signal from the video camera head 16 to provide an output video signal. The output video signal is transmitted via cable 32, radio frequency (RF) transmission or any other suitable means to a video display unit 34 that shows real time images of the interior of the pipe P along with a visual indication of the length of push cable 12 currently inside the pipe P. This visual indication of the length of push cable 12 currently inside the pipe P is preferably indicated in alphanumeric form, although it could be indicated as a bar graph or via some other technique well known to designers of graphical user interfaces.

An optional electromagnetic/inductive transmitter 36 (FIG. 3) may be mounted inside the coil spring 18 and is powered via one of the conductors in the push cable 12. The transmitter 36 could also be mounted inside the camera head 16. The transmitter 36 preferably transmits at five hundred and twelve Hertz. When the video camera head 16 has been pushed down a subterranean pipe an operator 38 (FIG. 1) can physically locate the head 16 with a hand-held receiver 40 at underground depths up to about twenty feet.

Our system 10 further includes a power supply 42 (FIG. 3) that provides power for the camera head 16, distance sensing module 26, optional transmitter 36 and video display unit 34. A VCR (not shown) may be connected to the power supply 42 and video display unit 34 for recording the inspection of the inside of the pipe P. This recording will show the date, time, distance and other information from the distance sensing module 26 superimposed over images of the inside of the pipe P as the camera head 16 is moved along inside the same.

Figure 3:
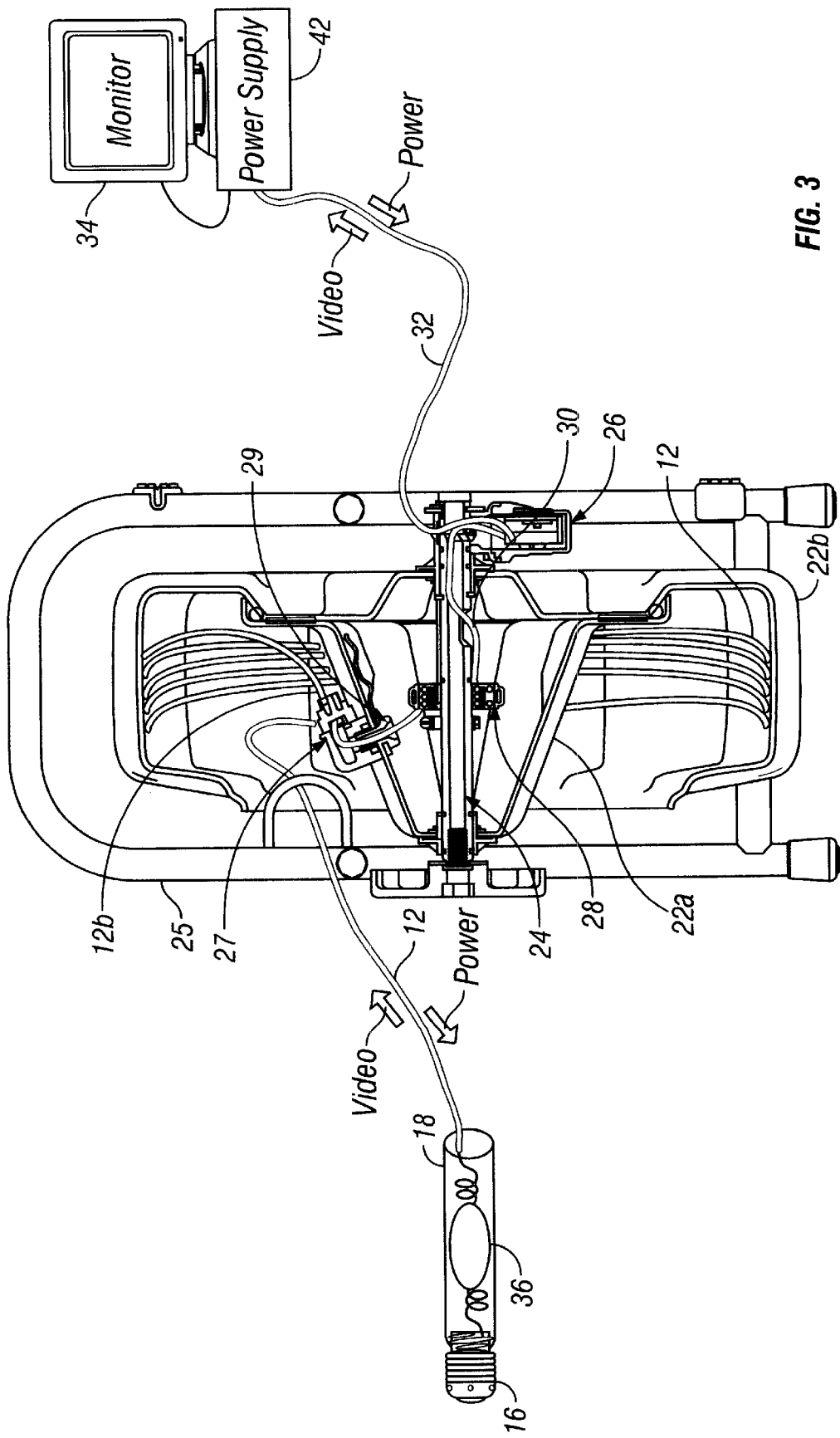
FIG. 3 is an enlarged diagrammatic view of the system of FIG. 1 showing the push reel and distance sensing module in section along a vertical plane intersecting the axis of the push reel.
Figure 6:
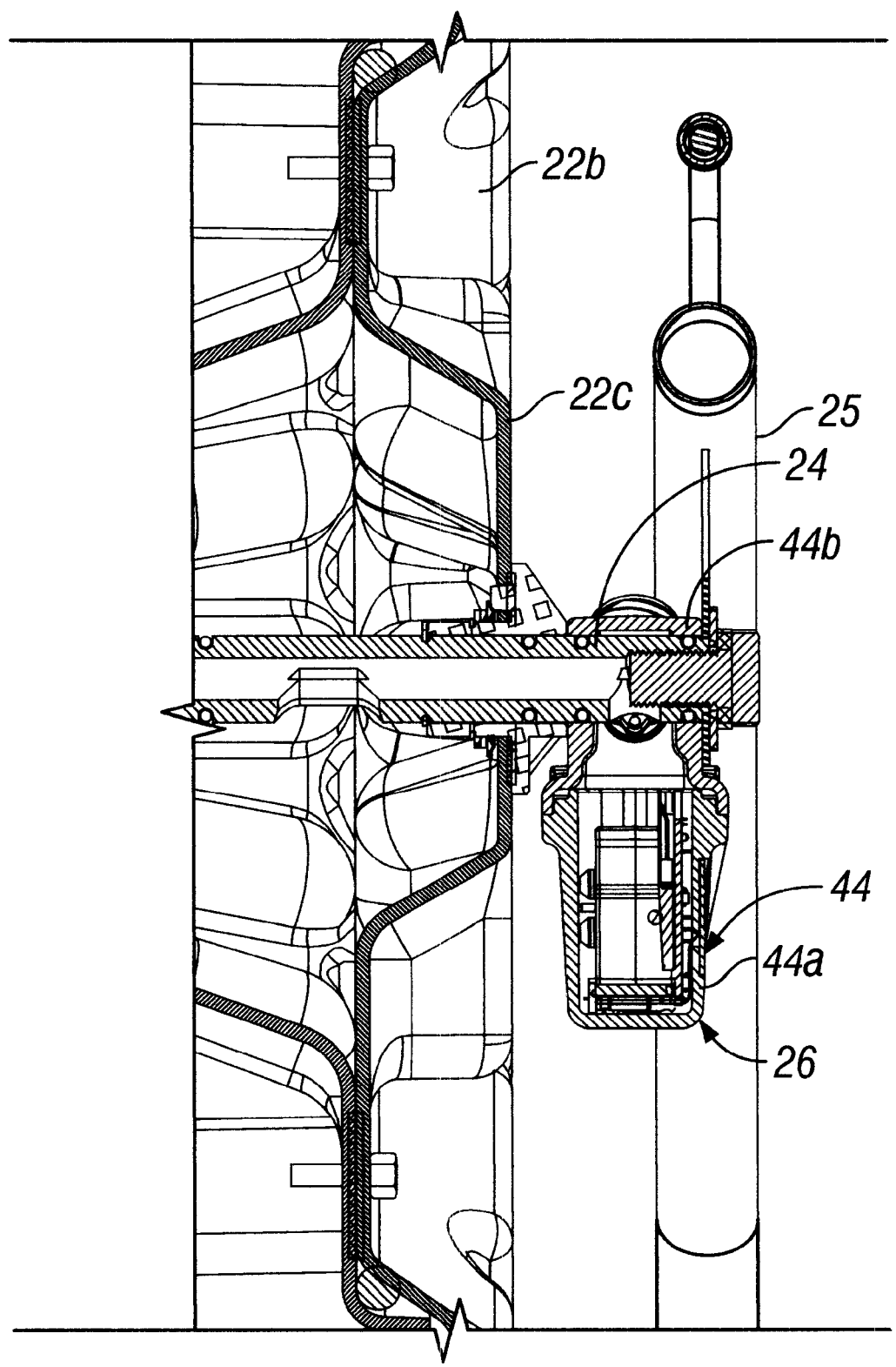
FIG. 6 is a greatly enlarged fragmentary sectional view of the push reel and distance sensing module taken along line 6—6 of FIG. 5.
Figure 10:
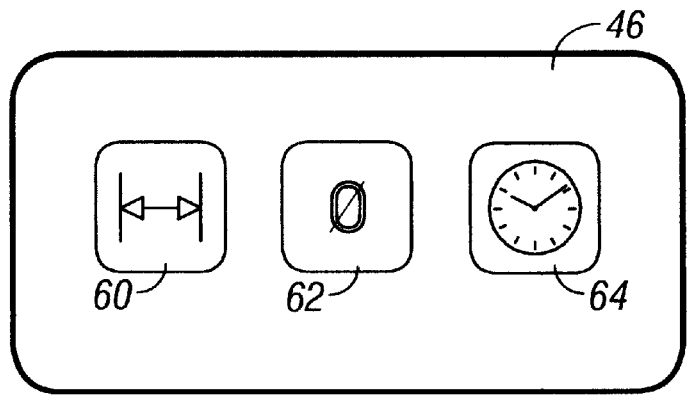
FIG. 10 is a greatly enlarged view of the control panel of the distance sensing module of FIGS. 7–9.
Figure 13:
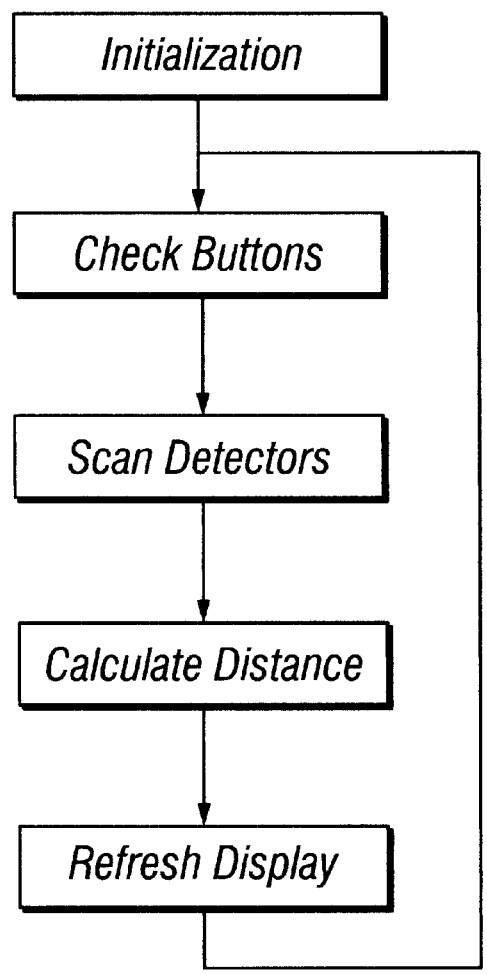
FIGS. 13–19 are a series of flow diagrams that illustrate the operation of the system of FIG. 1.

Referring to FIGS. 7–10, the distance sensing module 26 includes an outer rectangular plastic housing 44 with a hollow base 44a and a hollow lid 44b (FIG. 6) with a hole for receiving the axle 24 (FIG. 6) therethrough. A three button control panel 46 (FIGS. 7–10) is held in a rectangular recess 48 formed in an forward outer surface of the base 44a of the housing 44 of the distance sensing module 26. A ribbon cable 50 electrically connects the individual push-button switches of the control panel 46 to a pair of interconnected PC boards 52 and 54 mounted inside the base 44a of the plastic housing 44. The PC board 52 carries two non-contact sensor pairs inside modules 56 and 58 there being one pair inside each module. These sensor pairs are able to send and receive infrared radiation (IR radiation) with respect to an indexing surface of the push reel 22 through the IR transparent rear side of the base 44a of the plastic housing 44. The IR radiation is preferably modulated at a frequency of approximately thirty-eight kilohertz to enhance noise rejection and provide improved edge discrimination. The PC boards 52 and 54 carry electronic circuitry hereafter described that allow the distance sensing module 26 to detect an amount and direction of rotation of the push reel 22 and to generate a visual overlay signal that is joined with the image signal from the camera head 16 to form an output signal that is sent to the video display monitor 34. The PC boards 52 and 54 also carry electronic circuitry for time keeping and configuration memory functions hereafter described. This same electronic circuitry allows the system to be calibrated and to be programmed to perform the functions of the system hereafter described. As best seen in FIG. 10, the control panel 46 has a manually actuable distance push-button 60, a manually actuable zero push button 62 and a manually actuable time push-button 64. The PC board 54 includes male pin connectors 66 (FIGS. 7 and 9) for connection to mating female connectors (not shown) on the cables 30 and 32 (FIG. 3).

Figure 7:
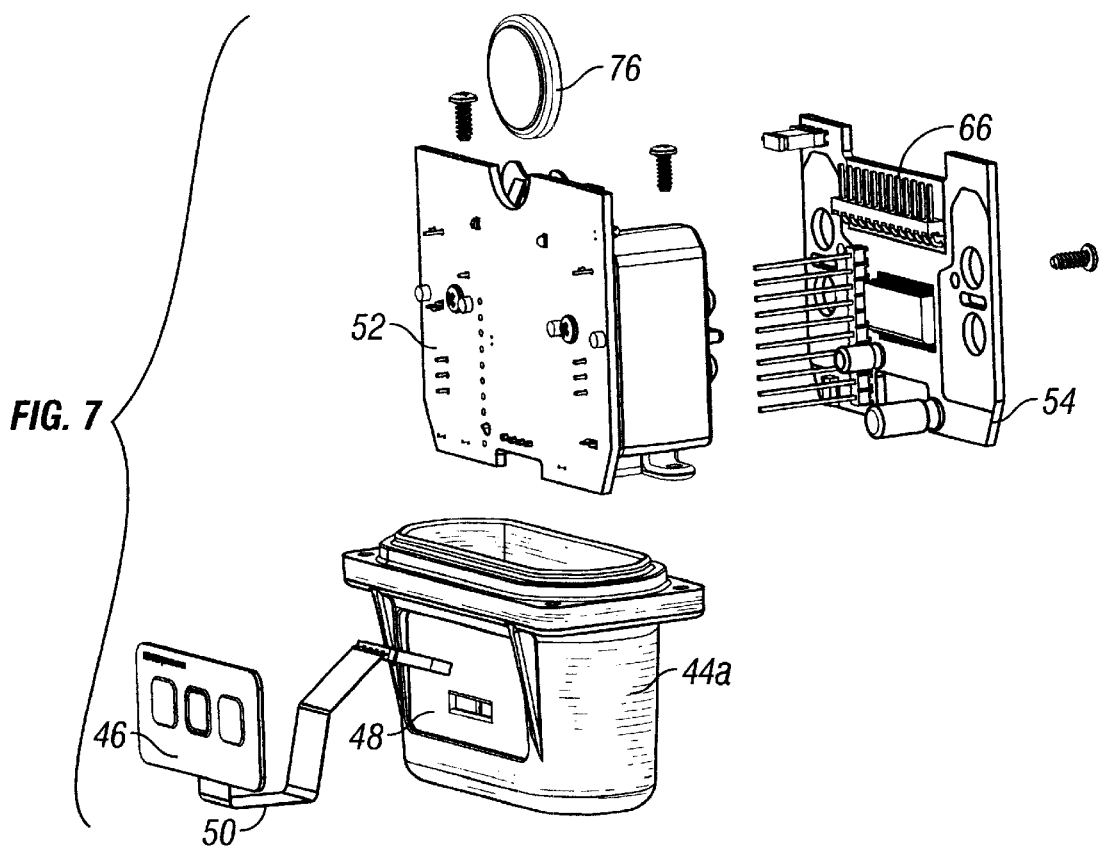
FIGS. 7 and 8 are enlarged, exploded perspective views taken from the front and rear sides, respectively, of the distance sensing module of the system of FIG. 1.
Figure 8:
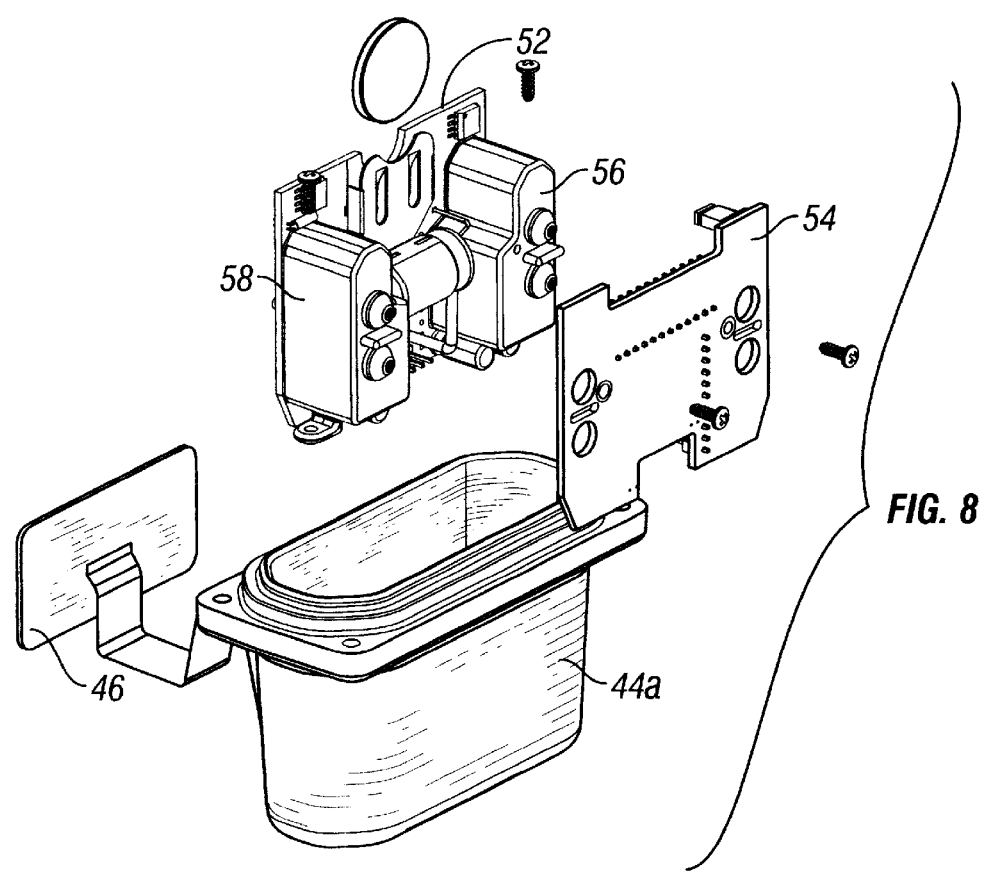
Figure 9:
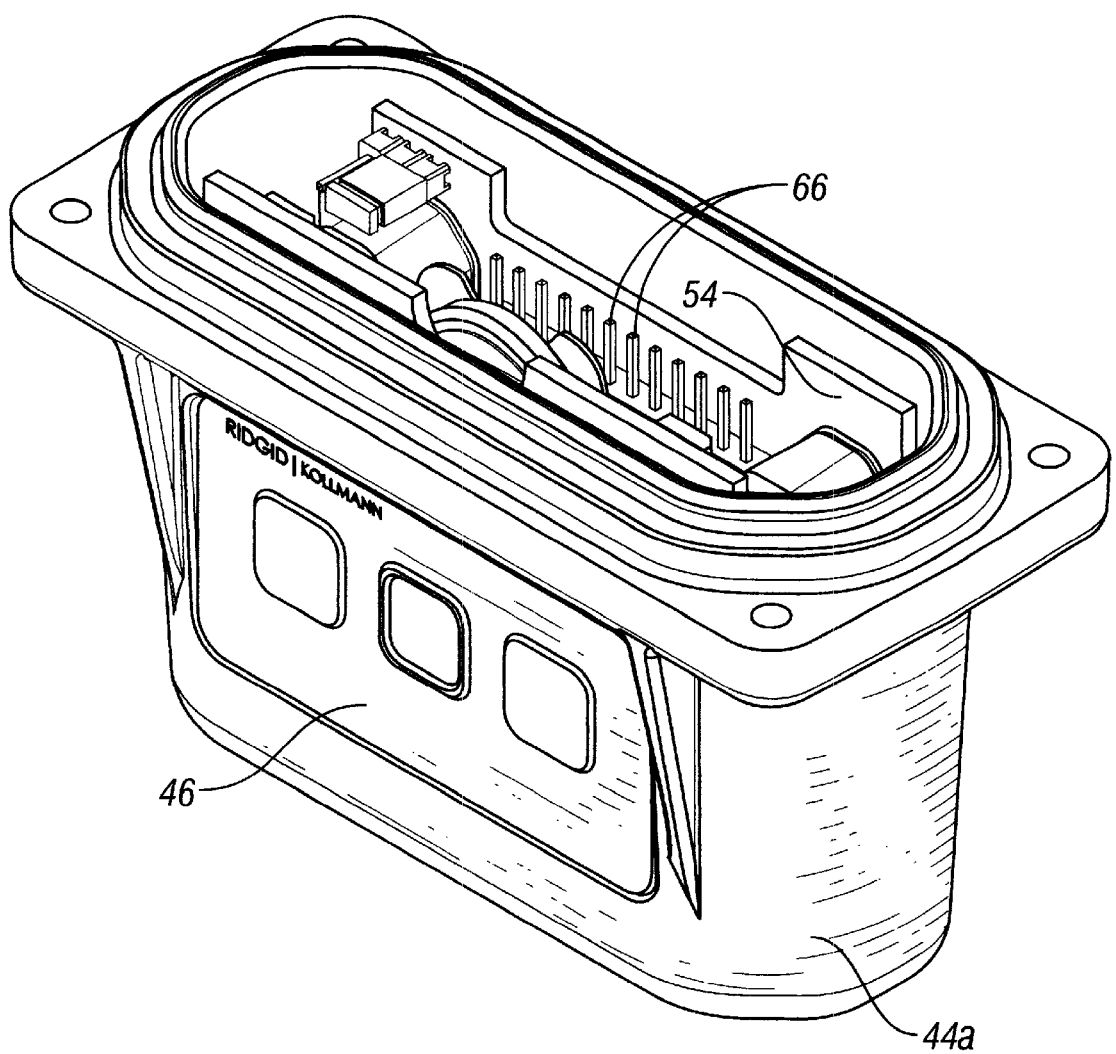
FIG. 9 is an enlarged perspective view of the front side of the distance sensing module of FIGS. 7 and 8 with the circuit board installed in its outer housing.
Figure 11:
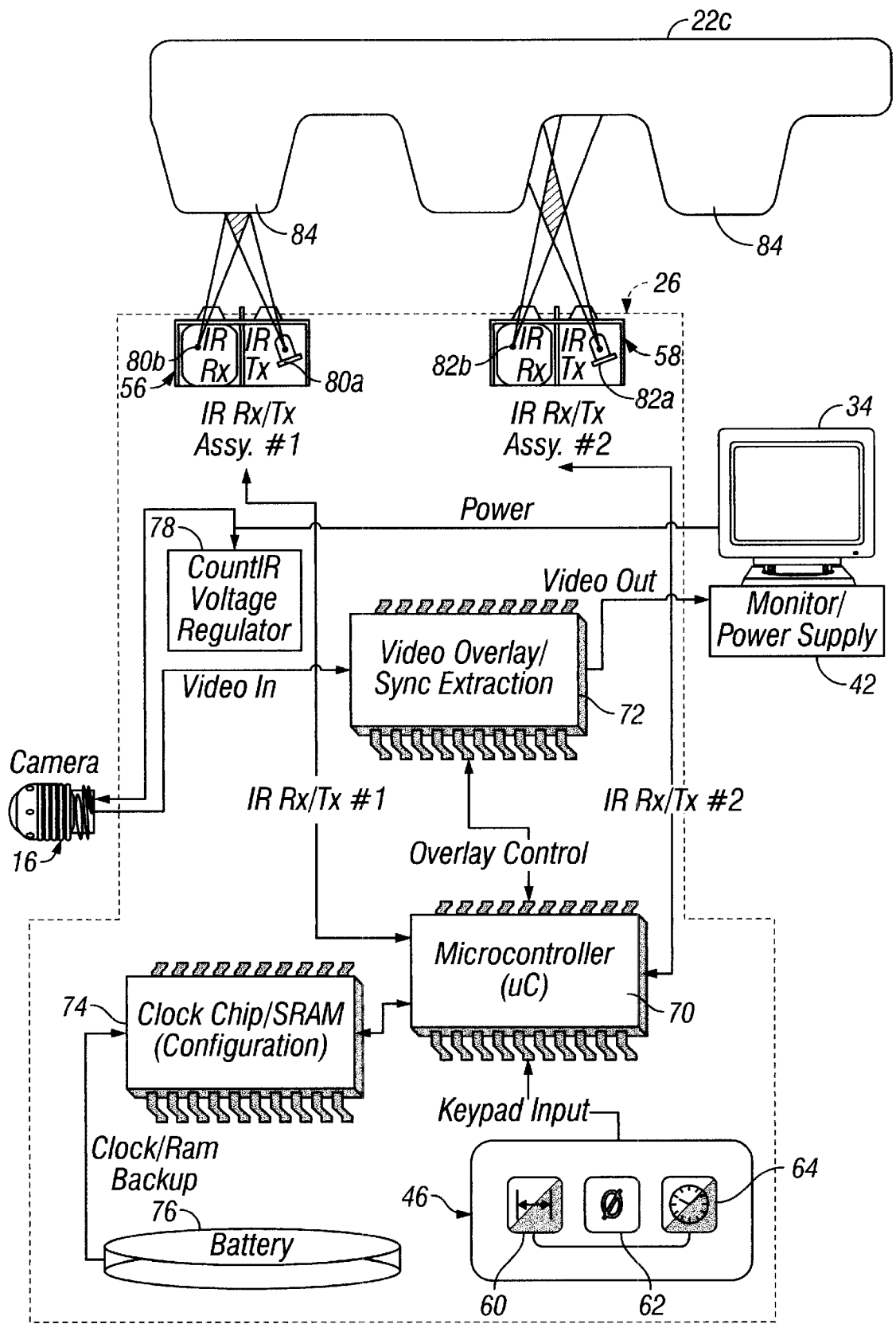
FIG. 11 is a hybrid pictorial block diagram of the distance sensing module of the system of FIG. 1.

FIG. 11 is a hybrid pictorial block diagram of the distance sensing module 26 of the preferred embodiment of our video pipe inspection distance measuring system 10. The diagram of FIG. 11 is an overview of the electronics of the distance sensing module, and it will be understood by those skilled in the art that there are additional electronic parts not illustrated that operate in support of the blocks shown. The electronics portion of the distance sensing module 26 is carried on the PC boards 52 and 54 (FIGS. 7 and 8). An integrated circuit micro-controller 70 (FIG. 11) provides the control for the system and preferably includes an integrated random access memory (RAM) and read-only-memory (ROM) for the system control program which is "burned" into the ROM. The micro-controller 70 performs all of the logical and arithmetic operations required by the control program. FIGS. 13–19 provide flow diagrams of the control program. Initial set up and calibration can be performed by the user via manual actuation of the keypad 46 which is connected to the micro-controller 70. The push buttons 60, 62 and 64 can be depressed with the index finger to change the operation of the system as well as to configure the system.

An integrated circuit video overlay/sync extraction device 72 (FIG. 11) receives the video image signal from the camera head 16, extracts synchronization information which is fed to the micro-controller 70, and inserts an overlay signal representing alphanumeric text and/or graphics "on top of" the video image signal, as determined by the micro-controller 70. The device 72 thus provides an output video signal that is fed to the video display unit 34. The video overlay/sync extraction device 72 can also generate its own "blue screen" video signal so that alphanumeric information and graphics can still be displayed on the display unit 34, even in the absence of a video image signal from the camera head 16.

A clock chip/static RAM (SRAM) device 74 (FIG. 11) provides a real time clock that sends time and date information to the micro-controller 70 as well as a small amount of memory that is used to store system configuration information. This can include calibration information as well as the operational state of the system at last run, total length accumulated and owner information including name and telephone number. The clock chip/SRAM device 74 receives power from a battery 76. This allows the system 10 to maintain accurate time and date information even when power is not available from the power supply 42. The battery 76 is preferably replaceable and has sufficient stored energy to power the clock chip/SRAM device 74 for several years prior to replacement. Lithium batteries are particularly well suited for this task.

A voltage regulator 78 (FIG. 11) supplies power from the power supply 42 to the distance sensing module 26. While this is occurring, power from the battery 76 is not utilized by the clock chip/SRAM device 74.

A first non-contact sensor pair 80a and 80b (FIG. 11) inside module 56 and a second non-contact sensor pair 82a and 82b inside module 58 send and receive modulated IR radiation with respect to an indexing surface of the push reel 22. Sensor elements 80a and 82a preferably comprise infrared transmitting light emitting diodes (IR-LEDs) and sensor elements 80b and 82b preferably comprise infrared detectors (IR-RECEIVERS). The emitter/detector pairs 80a, 80b and 82a, 82b are mounted inside an injection molded rectangular plastic housings to form the modules 56 and 58, respectively. The plastic housings align the emitter/detector pairs 80a, 80b and 82a, 82b so that they can emit and receive IR radiation at predetermined angles through pin hole lenses in the plastic housings. The IR radiation emitted from the emitters 80a and 82a is transmitted to the surface of an outer hub portion 22c (FIGS. 6 and 11) of the push reel 22. This IR radiation is reflected back toward the distance sensing module 26. However, the emitter IR beam zone and the receiver IR beam zone only converge when the IR radiation strikes the flat top surfaces of each of a plurality of circumferentially spaced, radially extending ribs 84 of the outer hub portion 22c. This is illustrated in FIG. 11 in connection with the left hand module 56. The emitter IR beam zone and the receiver IR beam zone do not converge when the IR radiation strikes the angled sidewalls of one of the ribs 84, as illustrated in FIG. 11 in connection with the right hand module 58, or when the emitted IR radiation strikes the flat valley between a pair of adjacent ribs 84.

It will be understood by those skilled in the art that using two non-contact sensor pairs in a quadrature detection arrangement enables the micro-controller 70 to determine both the amount and direction of rotation of the push reel 22 and to determine therefrom the length of the video push cable 12 extending within the pipe P at any given time. This length is provided to the video overlay/sync extraction device 72 for transmission to the display unit 34. The display unit 34 then provides a real time video image of the internal walls of the pipe P and the overlay that is simultaneously displayed indicates the location of the camera head 16 within the pipe P. This permits the precise location of a fracture, obstruction, leak etc. in the pipe P to be pinpointed for future repair.

As illustrated in FIG. 11, the emitter and detector of each non-contact sensor pair are angled so that a beam from the emitter (80a or 82a) only converges with a detection area of the detector (80b or 82b) on a top surface of each rib 84 as it moves past the distance sensing module 26. Other forms of non-contact emitters and detectors could be used such as those that emit and detect radiation in the visible wavelength, including laser generated light. In addition, other non-contact sensors that do not depend upon radiation could be utilized, such as Hall effect sensors. Furthermore, it is not necessary for the push reel 22 to incorporate the ribbed outer hub portion 22c. Other indexing surfaces with or without implanted magnets or other distance marking devices could be utilized. For example, reflective and non-reflective paint and stickers could be used as an indexing surface intercepted by a beam of suitable radiation.

The following functional description of the preferred embodiment of our system 10 is general in nature. A more detailed understanding of the functions of our system 10 may be gained from FIGS. 13–19 which are flow diagrams of the control program for the system 10. Normally the system would be calibrated when manufactured in terms of the size of the push reel 22 and the full length of the push cable 12. The user would initially program the time and date, and user information such as name and/or phone number. During normal operation of the system the user can configure the system to display up to four items overlaid over the real time images of the inside of the pipe, namely: 1) the time of day displayed in either AM/PM or twenty-four hour format; 2) the date displayed in either MM/DD/YY or DD/MM/ format; 3) the company name and/or phone number (up to eighteen characters); and 4) the distance of the camera head 16 into the pipe P in feet or meters. The three push buttons 60, 62 and 64 (FIG. 10), can be depressed sequentially or in other combinations by the user to control the operation of the system depicted in FIGS. 13–19.

Pressing the distance push button 60 (FIG. 10) while the system is in its normal operation will toggle the display of the distance ON and OFF. Quickly pressing the time push button 64 will toggle the system through the following states: 1) Time Display ON and Date Display ON; 2) Time Display OFF and Date Display ON; 3) Time Display ON and Date Display OFF; and 4) Time Display OFF and Date Display OFF. When the fourth state is reached, pushing the push button 64 again will return the system to the first state. Pressing and holding down the push button 64 for several seconds will toggle the USER INFORMATION display ON and OFF. The contents of the USER INFORMATION field are changed in the calibration screen. Pressing the zero push button 62 internally sets the offset distance to the current value of the absolute distance. This makes the distance indicated on the display unit 34 zero, while maintaining the actual distance internally. This feature can be useful if a length of cable has to be un-spooled from the push reel 22 prior to placing the camera head 16 into the pipe P to perform the inspection, or when measuring distances between features inside the pipe.

FIGS. 12A–12E illustrate the manner in which the system determines the distance of the push cable 12 inside the pipe P with the non-contact sensor pairs inside the modules 56 and 58. At start-up, the distance is assumed to be zero if the system has been OFF for more than a few seconds. If the OFF time has been a very short time, e.g. five seconds or less, the last count of the number of ribs 84 is reloaded from the clock chip/SRAM device 74 to allow recovery from short power outages. Otherwise, the absolute count of the number of ribs 84 counted is zeroed, and the offset distance is zeroed. The distance value that is displayed on the display unit 34 is determined from the absolute count of the number of ribs that has moved past the distance sensing module 26, and subtracting the offset distance.

Figure 12A:
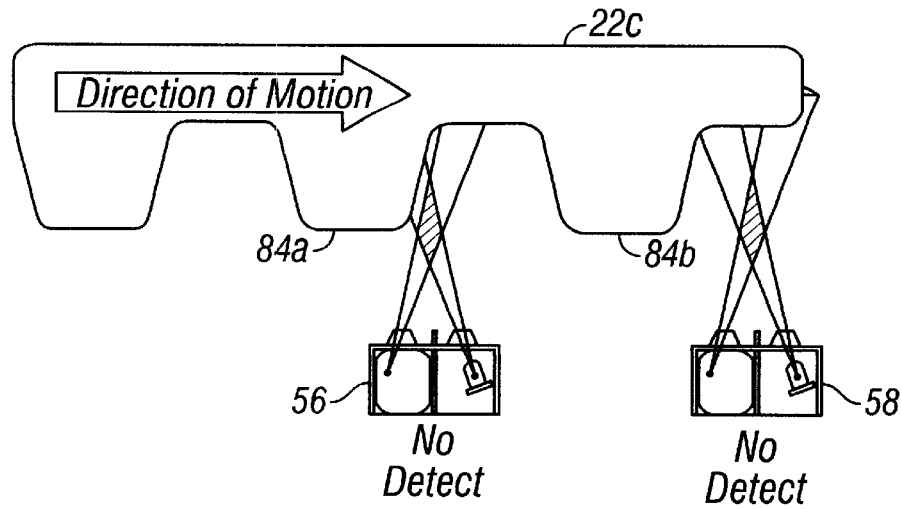
FIGS. 12A–12E are a series of diagrammatic views illustrating the manner in which the two non-contact sensor pairs of the distance sensing module scan the indexing surface of the push reel as it moves past the module to generate signals that represent the amount and direction of motion of the push reel.
Figure 12B:
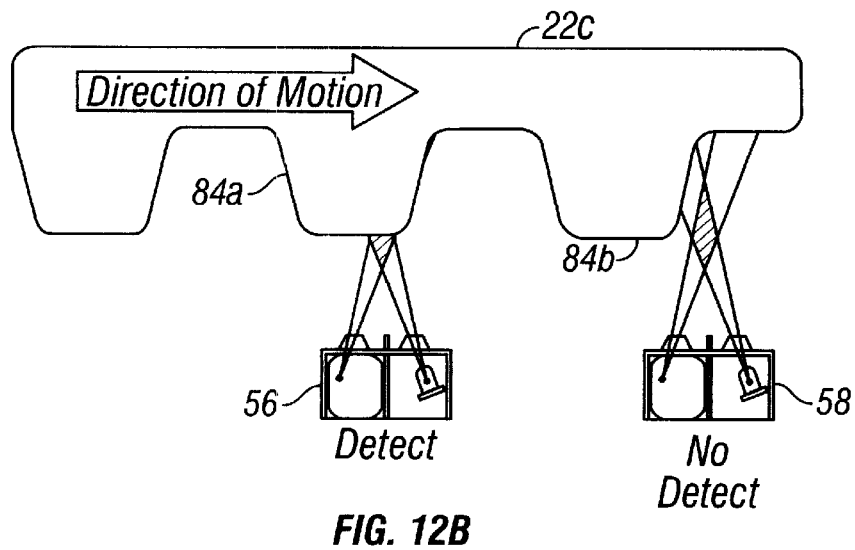
Figure 12C:
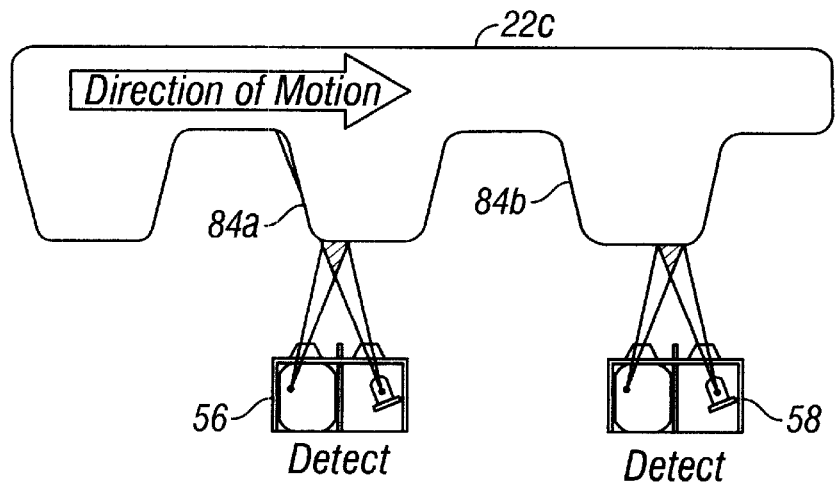
Figure 12D:
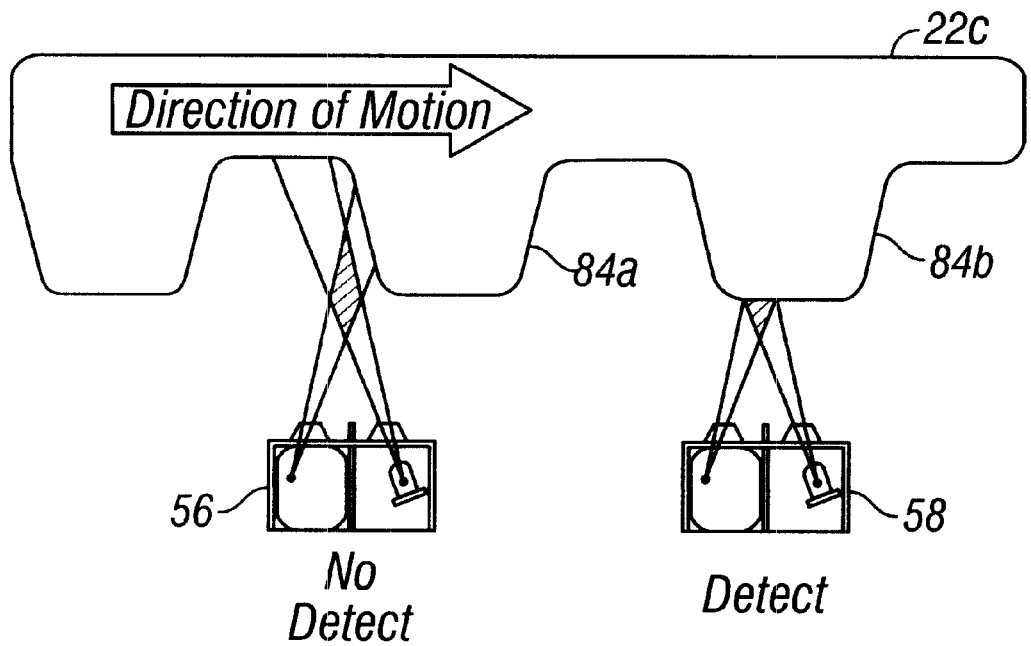
Figure 12E:
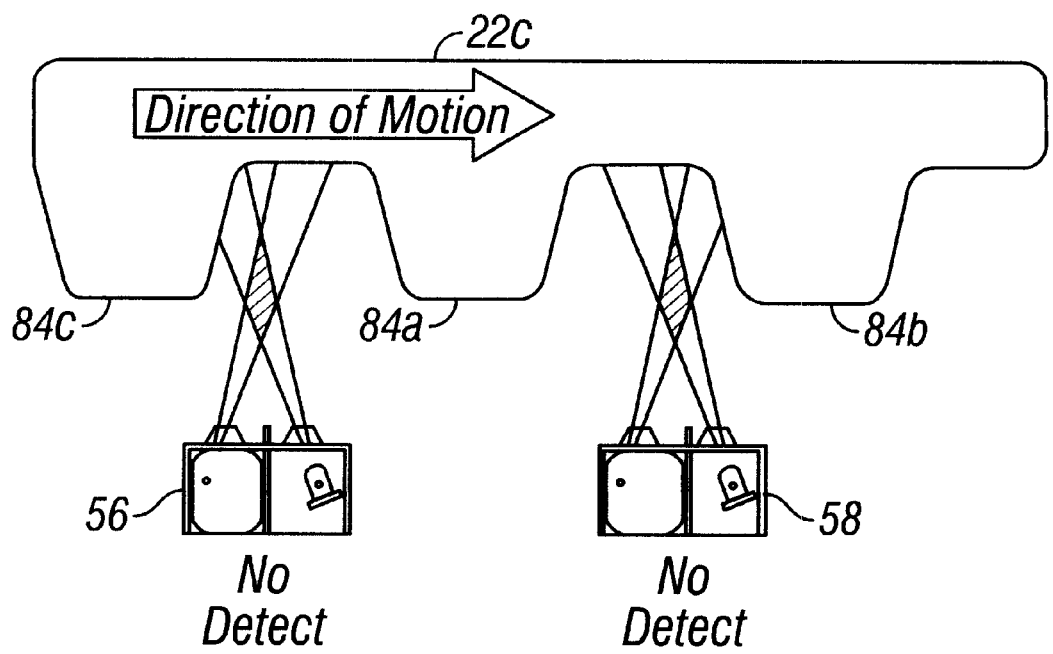
Figure 14:
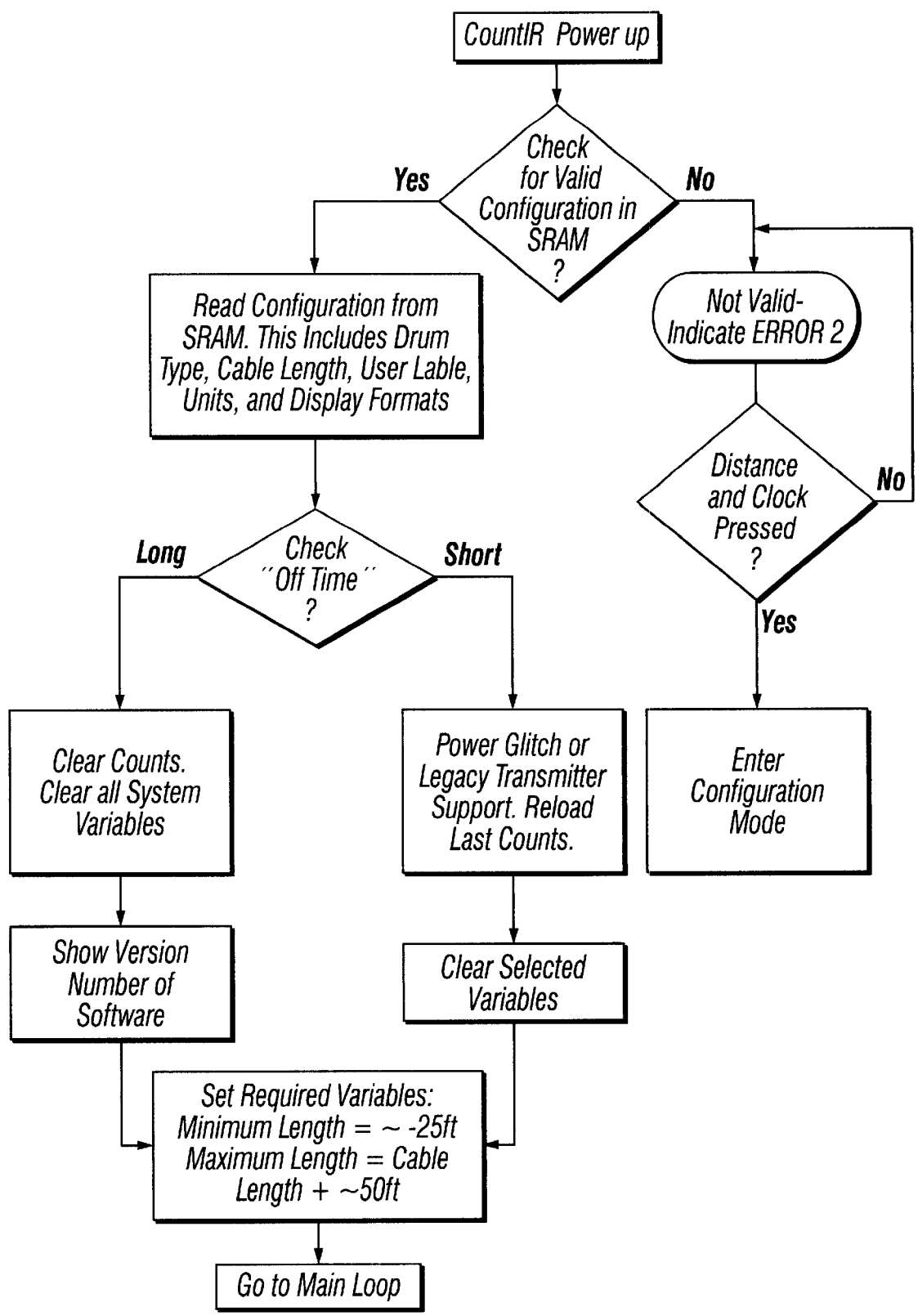
Figure 15:
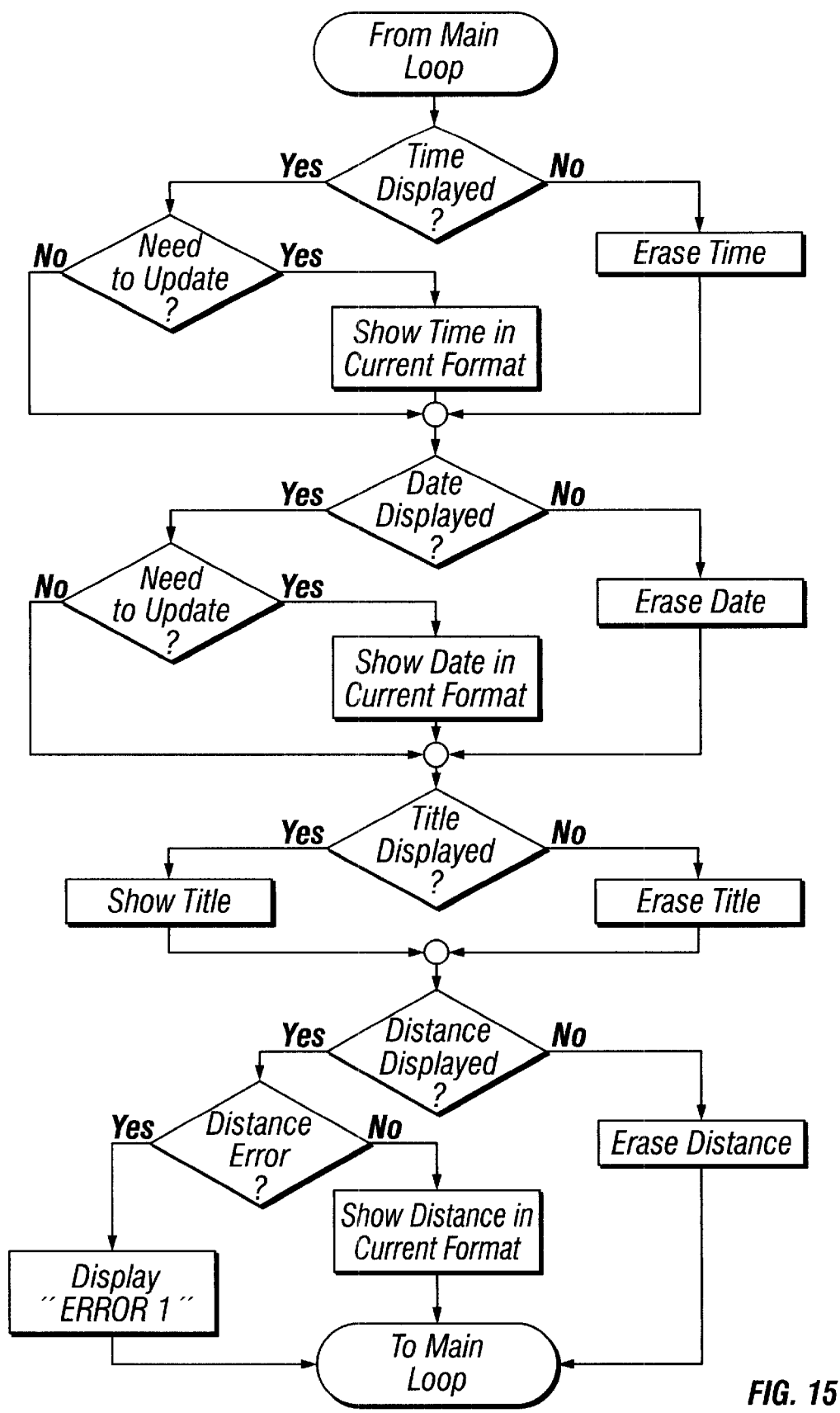
Figure 16:
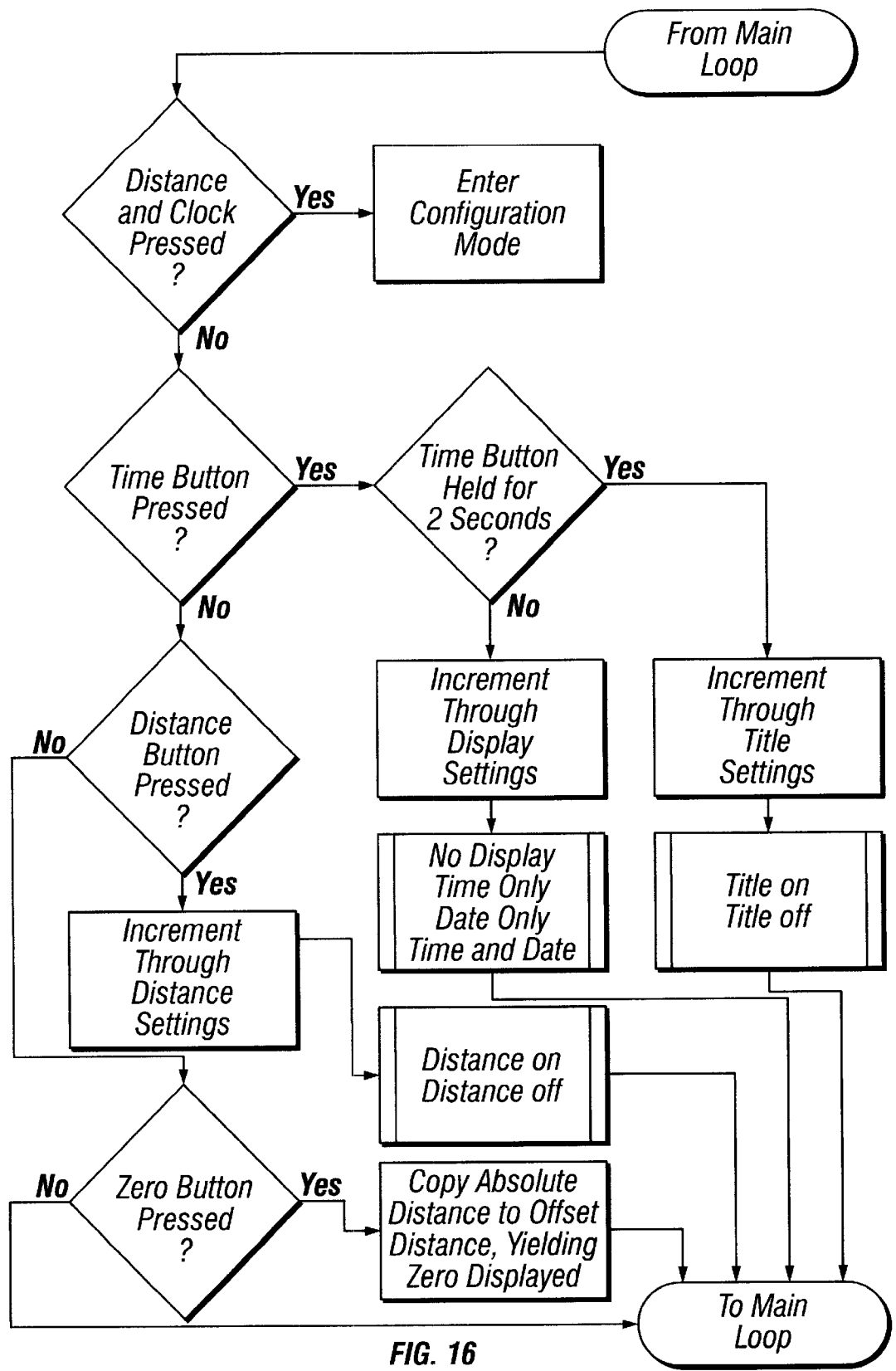
Figure 17A:
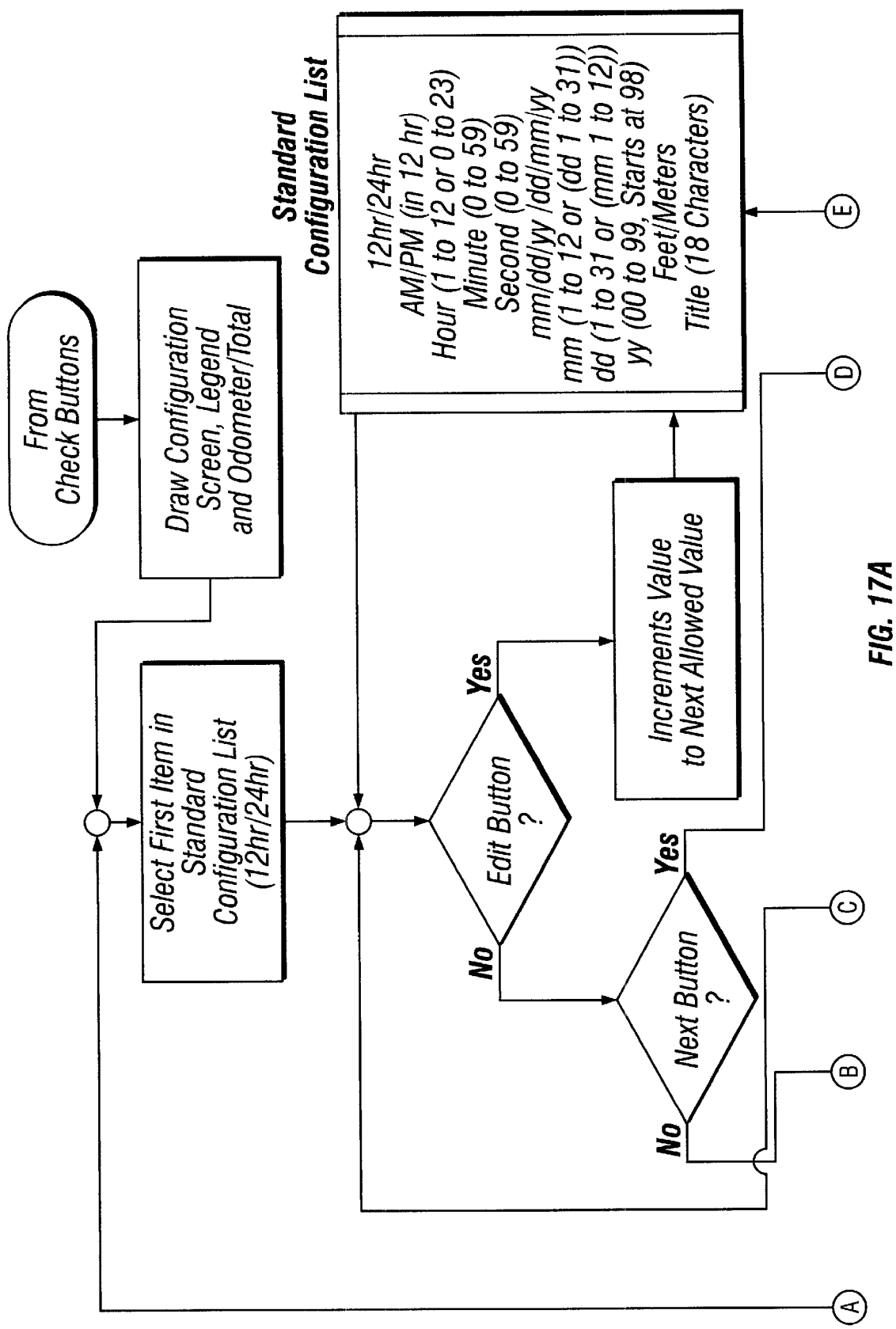
Figure 17B:
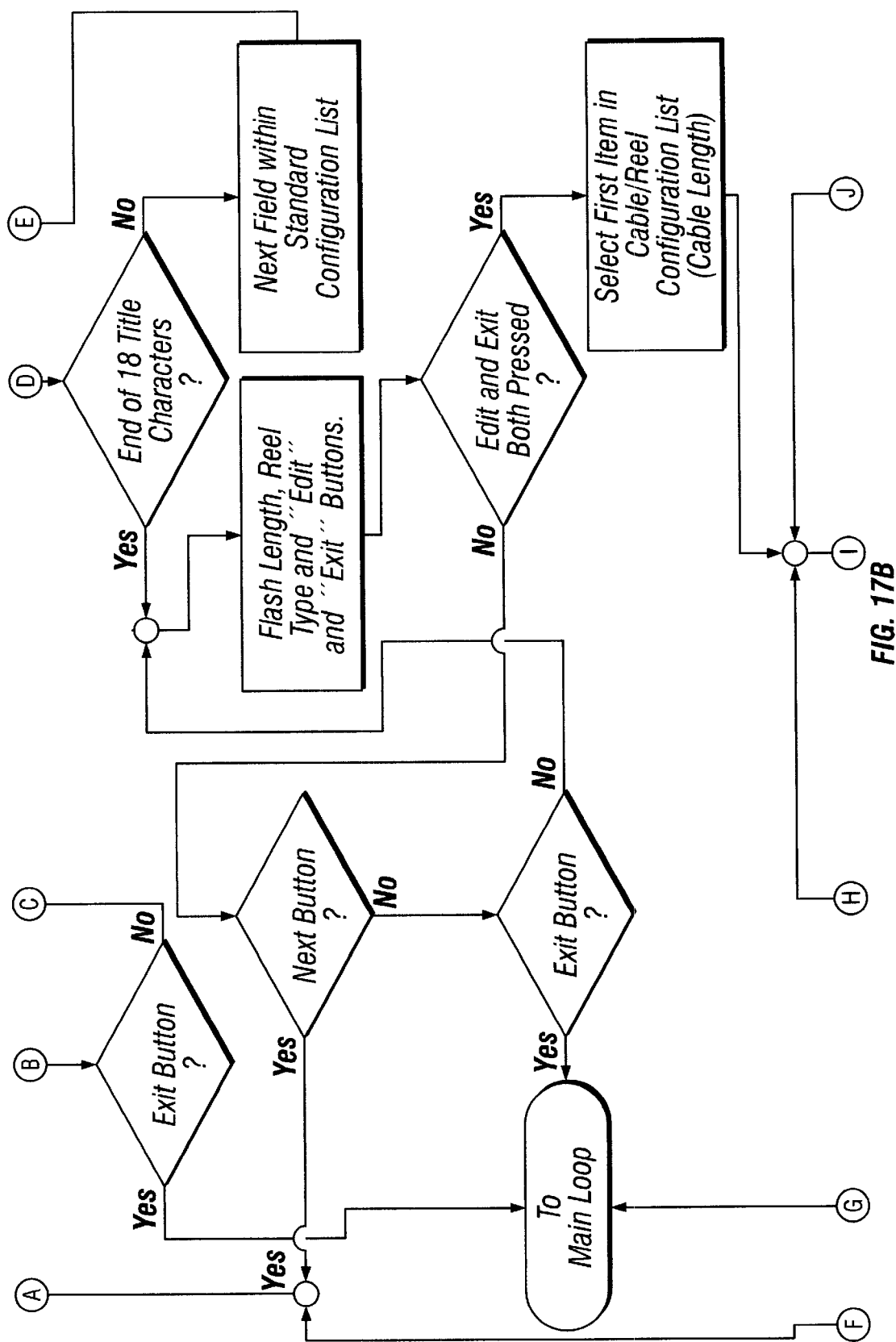
Figure 17C:
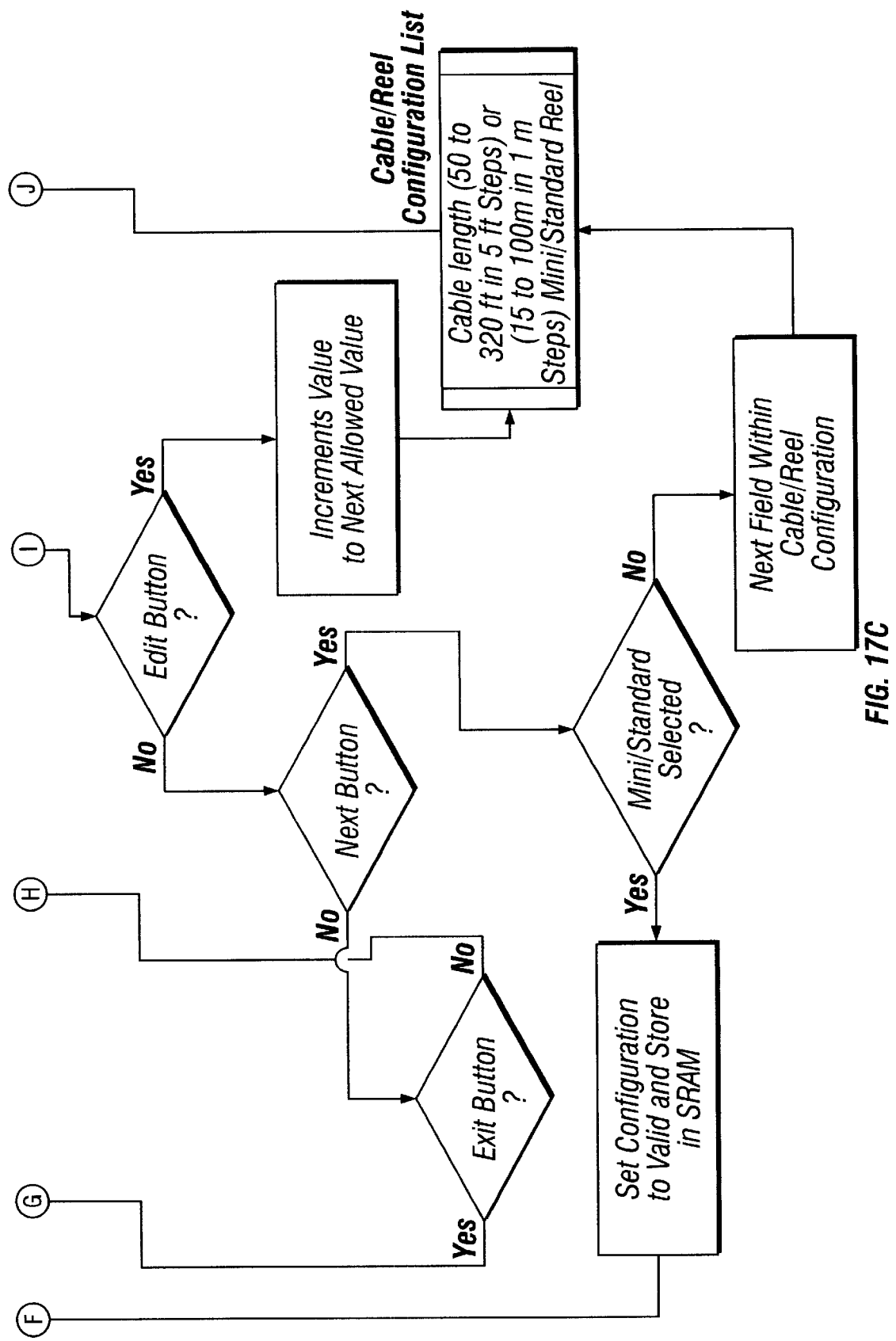
Figure 18A:
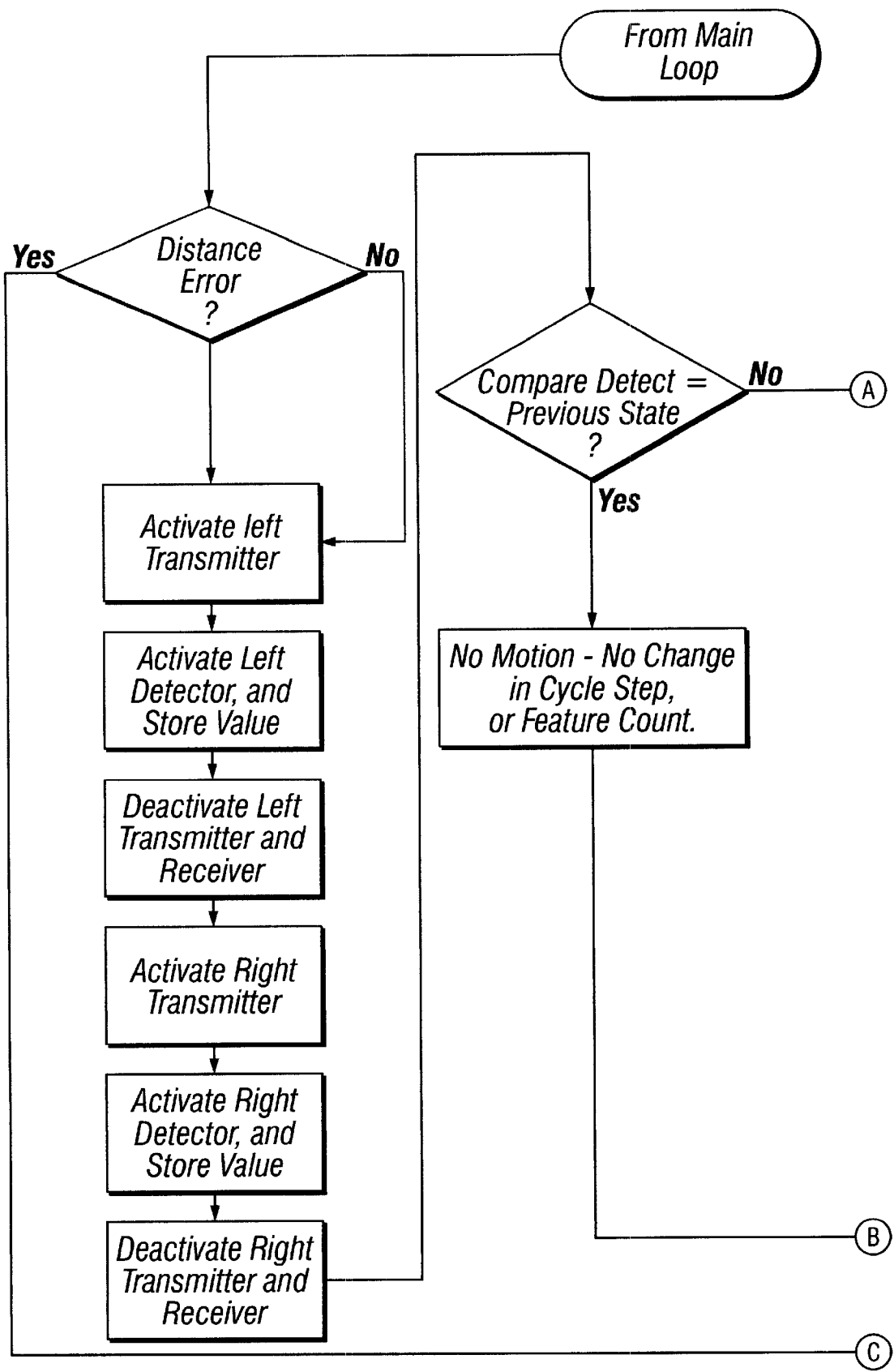
Figure 18B:
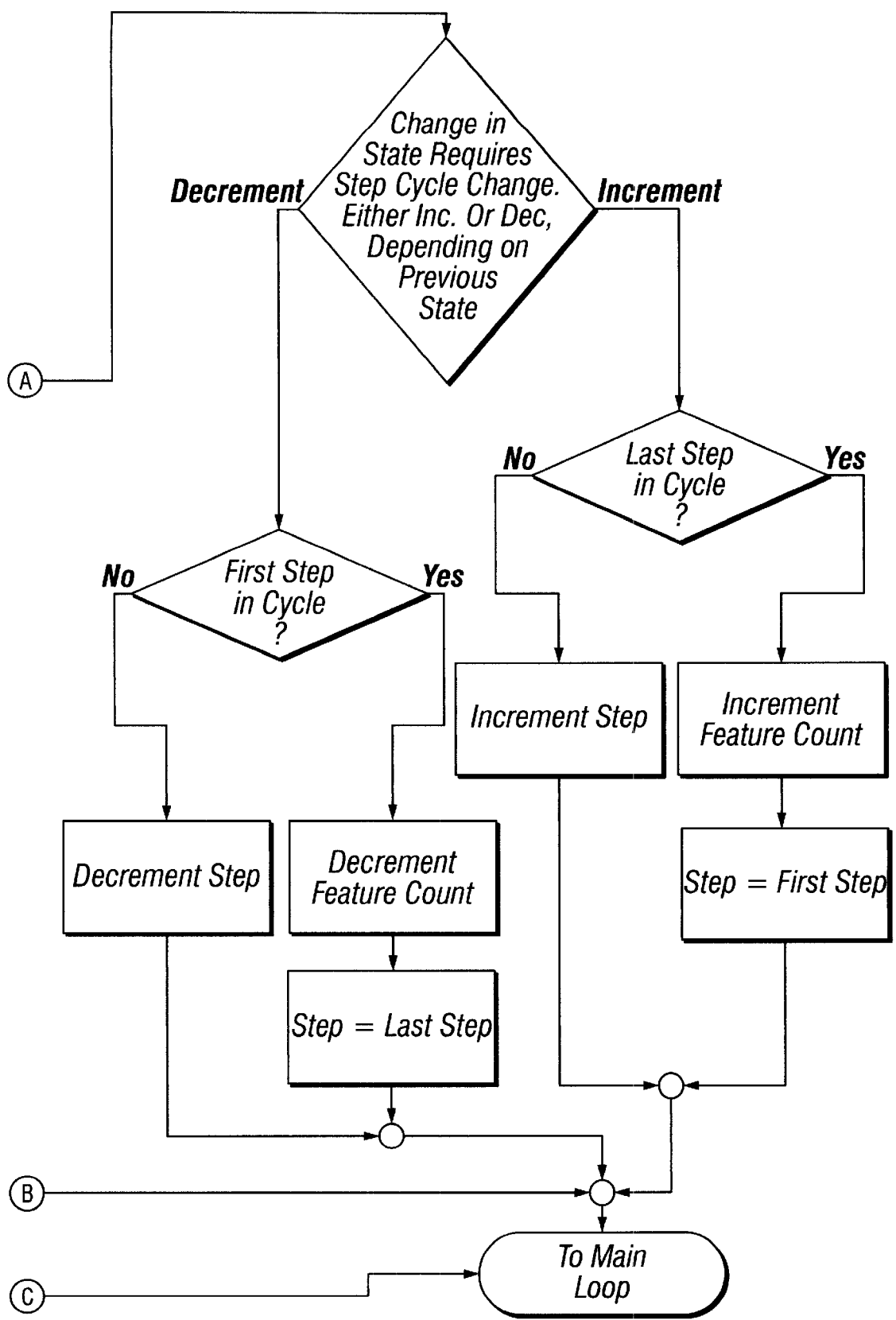
Figure 19:
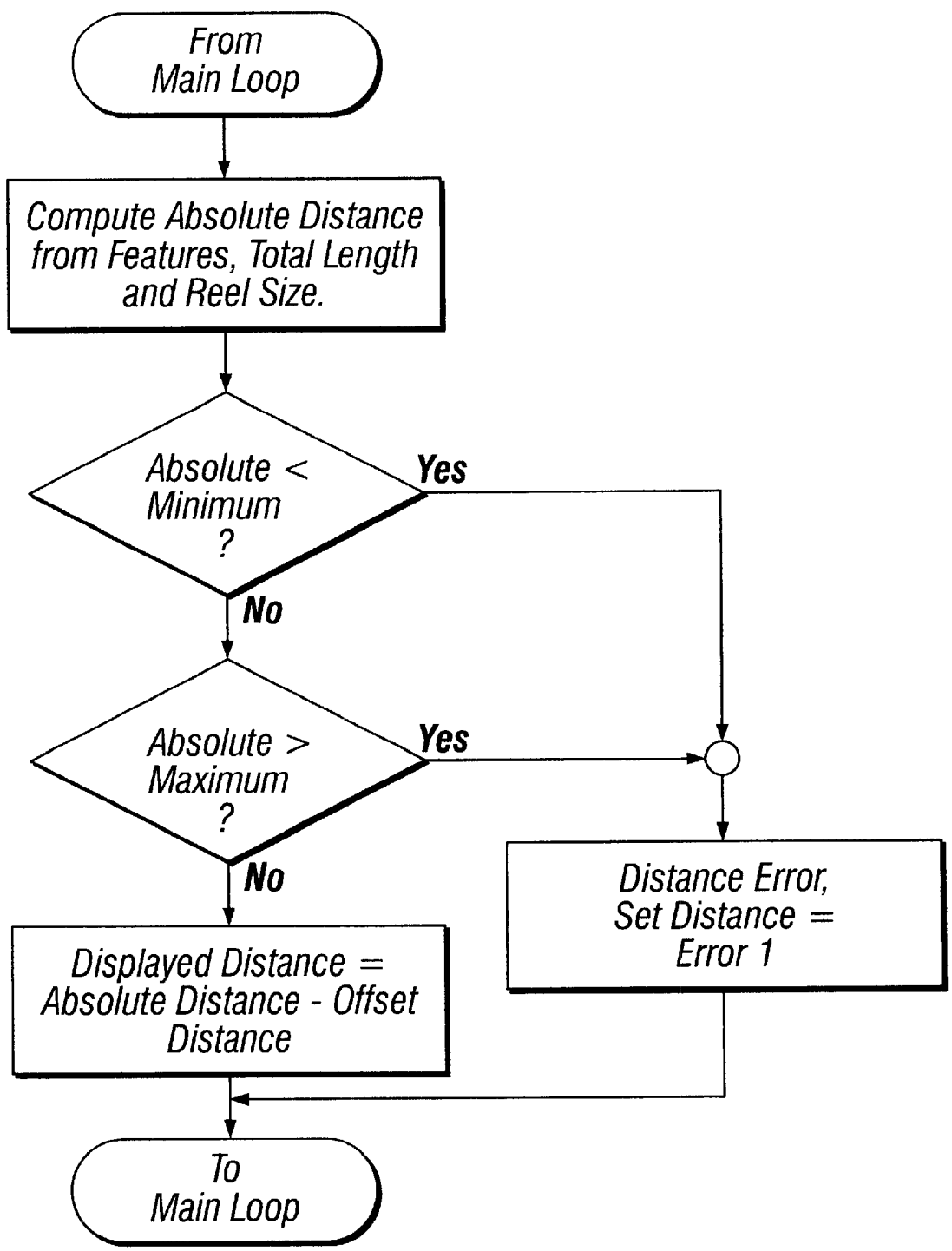

The detectors 80b and 82b in the modules 56 and 58, respectively are periodically turned ON and OFF to check for a rib 84. If a rib 84 is within the detection range of one of the detectors 80b or 82b, then that detector indicates a rib detection to the micro-controller 70. The micro-controller 70 looks at the new state information to determine how it should react. FIGS. 12A through 12E illustrate a cycle of state changes that would normally be encountered when the outer hub portion 22c is rotating from left to right in these figures, and a pair of ribs 84 pass by both of the non-contact sensor modules 56 and 58. In FIG. 12A the left sensor module 56 is in a no detect condition and the right sensor module 58 is in a no detect condition. Neither the left detector 80b nor the right detector 82b detects any infrared light. In FIG. 12B the left sensor module 56 is in a detect condition and the right sensor module 58 is in a no detect condition. The left module 56 "sees" the top flat surface of one of the ribs 84a, but the right module 58 only sees a valley and part of the angled sidewall of an adjacent rib of the ribs 84b. In FIG. 12C the left sensor module 56 is in a detect condition and the right sensor module 58 is in a detect condition. In this state, both the left module 56 and the right module 58 see the top flat surfaces of the two adjacent ribs 84a and 84b. In FIG. 12D the left sensor module 56 is in a no detect condition and the right sensor module 58 is in a detect condition. Here the left module 56 no longer sees the top flat surface of the rib 84a but instead sees a valley and the angled side wall of the rib 84a. The right module 58 still sees the top flat surface of the adjacent rib 84b. Finally, in FIG. 12E the left sensor module 56 is in a no detect condition and the right sensor module 58 is in a no detect condition. Here both modules 56 and 58 see valleys and angled side walls, but neither sees the top flat surface of either of the ribs 84a and 84b. At this point a single cycle has been completed. It should be noted that the position of ribs 84c and 84a relative to the modules 56 and 58 is the same in FIG. 12E as the position of ribs 84a and 84b in FIG. 12A. If the push reel 22 were to continue rotating in the same direction illustrated in FIGS. 12A–12E, then the next step would be that illustrated in FIG. 12B, except that a different pair of ribs 84c and 84a of the push reel 22 would be involved.

If the direction of rotation of the push reel 22 is reversed, so that the outer hub portion 22c moves from right to left in FIGS. 12A–12E, then the order of events described above would be reversed. A change of direction during a cycle, for instance movement of the outer hub portion 22c through FIGS. 12A–12C and then back through 12B to 12A, will prevent the partial cycle from being considered part of the count from which the micro-controller 70 determines the distance. The next cycle starts in the new direction of rotation. Our system prevents false counts from partial reflections as the state changes from, for example, FIG. 12B to FIG. 12C. As the push reel 22 rotates, there is a time when there is an occasional detection from the right detector 82b in the right module 58 as the transition to the state in FIG. 12C occurs. This bouncing back and fourth is allowed from one state to the next and is not counted by the micro-controller 70 as a change of direction until multiple states are crossed. In no event is a count added or subtracted unless an entire cycle is completed in either direction of rotation.

Obtaining the "count" of the number of ribs 84 that have moved past the distance sensing module 26 as described above in connection with FIGS. 12A–12E is a step in the process of determining the length of push cable 12 that has been payed out of the push reel 22 or wound back into the same. The turns of the push cable 12 are layered on top of each other and push radially outwardly toward the main annular body portion 22b of the push reel 22. The first layer of push cable 12 is wound at the same nominal diameter as the diameter of the inner surface of the annular body portion 22b. The turns of the push cable 12 will layer side-by-side to fill a layer. Subsequent layers will lay on top of the preceding layers, since the push cable 12 is fed into the center of the tire-shaped push reel 22. Each succeeding layer of push cable 12 that is forced into the push reel has a smaller diameter as each succeeding layer is formed radially inwardly of the preceding layer. Since the length of push cable 12 that can be stowed per revolution of the push reel 22 is a function of the diameter of the turn or layer in which it resides, and the diameter decreases for subsequent layers, the length of push cable 12 that can be stowed per turn decreases over time as more and more push cable is feed into the push reel 22.

The relationship between the size of the push reel 22, the diameter of the push cable 12, the total length of the push cable 12 and the cable feed over the entire range of the system (from fully loaded push reel to cable completely payed out) can be empirically determined for a given reel size, cable diameter and total cable length. A correction factor can thus be determined that must be applied by the micro-controller 70 in determining the distance of push cable 12 in the pipe P based on the amount and direction of rotation of the known size of push reel 22, the push cable diameter and the total length of the push cable 12. Stated another way, the micro-controller 70 can determine the length of cable to be shown on the display unit 34 from the total length of the cable 12, the diameter of the cable 12, the size of the push reel 22, the number of ribs 84 per single rotation of the push reel 22 and the predetermined correction factor.

When the system is first activated the count is zeroed, and the offset is also zeroed. The system then displays the absolute length or distance minus the offset distance, which starts at zero. As the push cable 12 is payed out, the detectors 80*b* and 82*b* walk through count cycles. The signals from the detectors 80*b* and 82*b* are used by the micro-controller 70 to determine the amount and direction of relative motion of the push reel 22, and then to determine the length of push cable that has been payed out. Rotation of the push reel 22 in one direction will increment the length whereas rotation of the push reel 22 in the opposite direction will decrement the length.

Because our system relies on several assumptions and pieces of calibration information, it is possible to make the system display an incorrect distance. Therefore, the following conditions must be observed in order to ensure accuracy: 1) the entire length of the push cable 12 must be stowed inside the push reel 22 when the system is first started; 2) the push reel type (size) must have been correctly pre-programmed; 3) the total length of the push cable 12 must be correctly pre-programmed; and 4) the correct type of cable must be used as cables having different outside diameters will layer differently. If all of the foregoing conditions are not satisfied, then the length of cable displayed can vary widely. In order to prevent this type of error from occurring the following tests are conducted, and will generate an error message on the display unit 34 if not passed: 1) whether the total cable length has been pre-programmed; 2) whether the drum size has been pre-programmed; 3) whether the absolute distance is less than a predetermined negative value (more cable fed into the push reel than previously pulled out); and 4) whether the absolute distance is greater than the maximum cable length by a certain value (the actual cable is longer than it should be). So long as no error is detected and displayed, the system will continue to update the date, time and length of cable displayed at regular intervals in alphanumeric and/or graphic form overlaid on top of the real time video images of the inside of the pipe.

While we have described a preferred embodiment of our system, it should be apparent to those skilled in the art that our system may be modified in arrangement and detail. For example, video data stream encoding and power line communication features could be added. Therefore, the protection afforded our invention should only be limited in accordance with the scope of the following claims.

We claim:

1. A video pipe inspection system, comprising:

a video camera head including an optical sensor and means for generating a video image signal representing real time images of scenes in view of the optical sensor;

a push reel;

a support frame;

means for rotatably mounting the push reel on the support frame;

an elongate push cable normally stored in continuous turns in the push reel and having a distal end operatively connected to the video camera head and a proximal end operatively connected to a central hub of the push reel, the push cable including at least one conductor for conveying the video image signal from the camera head, and the push cable having a predetermined resiliency and flexibility to permit the push cable to be unwound from the push reel in order to force the camera head a substantial distance down a length of pipe;

a distance sensing module mounted to the frame and including two non-contact sensor pairs for detecting an amount and a direction of relative motion of the push reel and providing a video overlay signal representing a length of the push cable in the pipe;

means for connecting the proximal end of the push cable hub and the distance sensing module so that the video overlay signal can be joined with the video image signal from the camera head to provide an output video signal;

a video display unit for receiving the output video signal and displaying real time images of the interior of the pipe along with a visual indication of the length of the push cable in the pipe; and means for conveying the output video signal from the distance sensing module to the video display unit.

2. The video pipe inspection system of claim 1 wherein the push reel includes an indexing surface that moves past the distance sensing module and each non-contact sensor pair includes an emitter for sending a beam of radiation to intercept the indexing surface of the reel and a detector for receiving radiation reflected by the indexing surface of the reel.

3. The video pipe inspection system of claim 1 wherein the distance sensing module includes a plurality of manual controls and circuitry for allowing a user to program the distance sensing module by actuating the manual controls.

4. The video pipe inspection system of claim 3 wherein the plurality of manual controls are provided in the form of a keypad.

5. The video pipe inspection system of claim 4 wherein the keypad includes a control for setting distance and a control for setting time.

6. The video pipe inspection system of claim 2 wherein each emitter is an infrared light emitting diode and each detector is an infrared receiver.

7. The video pipe inspection system of claim 2 wherein the indexing surface of the push reel is an outer hub portion including a plurality of circumferentially spaced, radially extending ribs.

8. The video pipe inspection system of claim 7 wherein the emitter and detector of each non-contact sensor pair are angled so that a beam from the emitter only converges with a detection area of the detector on a top surface of each rib as it moves past the distance sensing module.

9. The video pipe inspection system of claim 2 wherein the non-contact sensors are connected in a quadrature relationship.

10. The video pipe inspection system of claim 1 wherein the distance sensing module includes means for applying a predetermined correction factor for ensuring a predetermined accuracy of the length of push cable displayed that takes into account the varying diameter of the turns of the push cable that are payed out of the push reel, the diameter of the push reel, the length of the push cable and the diameter of the push cable.

11. A video pipe inspection system, comprising:

a video camera head including an optical sensor and means for generating a video image signal representing real time images of scenes in view of the optical sensor;

a push reel;

a support frame;

means for rotatably mounting the push reel on the support frame;

an elongate push cable normally stored in continuous turns in the push reel and having a distal end operatively connected to the video camera head and a proximal end, the push cable including a least one conductor for conveying the video image signal from the camera head, and the push cable having a predetermined resiliency and flexibility to permit the push cable to be unwound from the push reel in order to force the camera head a substantial distance down a length of pipe including at least one turn;

a distance sensing module mounted to the frame and including circuitry for detecting an amount and a direction of relative motion of the push reel and providing a video overlay signal representing a length of the push cable in the pipe; and means for connecting the proximal end of the push cable and the distance sensing module so that the video overlay signal can be joined with the video image signal from the camera head to provide an output video signal.

12. The video pipe inspection system of claim 11 wherein the push reel includes an indexing surface that moves past the distance sensing module and the distance sensing module includes two non-contact sensor pairs, each non-contact sensor pair including an emitter for sending a beam of radiation to intercept the indexing surface of the reel and a detector for receiving radiation reflected by the indexing surface of the reel.

13. The video pipe inspection system of claim 11 wherein the distance sensing module includes a plurality of manual controls and circuitry for allowing a user to program the distance sensing module by actuating the manual controls.

14. The video pipe inspection system of claim 13 wherein the plurality of manual controls are provided in the form of a keypad.

15. The video pipe inspection system of claim 11 wherein the distance sensing module includes a micro-controller and a video overlay/sync extraction device.

16. The video pipe inspection system of claim 12 wherein each emitter is an infrared light emitting diode and each detector is an infrared receiver.

17. The video pipe inspection system of claim 12 wherein the indexing surface of the push reel is an outer hub portion including a plurality of circumferentially spaced, radially extending ribs.

18. The video pipe inspection system of claim 17 wherein the emitter and detector of each non-contact sensor pair are angled so that a beam from the emitter only converges with a detection area of the detector on a top surface of each rib as it moves past the distance sensing module.

19. The video pipe inspection system of claim 12 wherein the non-contact sensors are connected in a quadrature relationship.

20. A video pipe inspection system, comprising:

a video camera head including an optical sensor and means for generating a video image signal representing real time images of scenes in view of the optical sensor;

a push reel including an indexing surface;

a support frame;

means for rotatably mounting the push reel on the support frame;

an elongate push cable normally stored in continuous turns in the push reel and having a distal end operatively connected to the video camera head and a proximal end operatively connected through a central hub of the push reel, the push cable including a least one conductor for conveying the video image signal from the camera head, and the push cable having a predetermined resiliency and flexibility to permit the push cable to be unwound from the push reel in order to force the camera head a substantial distance down a length of pipe having at least one turn;

a distance sensing module mounted to the frame and including means for detecting an amount and a direction of relative motion of the push reel and providing a video overlay signal representing a length of the push cable in the pipe, the distance sensing module including two non-contact sensor pairs, each non-contact sensor pair including an emitter for sending a beam of radiation to intercept the indexing surface of the reel as it moves past the distance sensing module and a detector for receiving radiation reflected by the indexing surface of the reel, the distance sensing module further including a plurality of manual controls and circuitry for allowing a user to program the distance sensing module by actuating the manual controls, and the distance sensing module further including means for applying a predetermined correction factor for ensuring a predetermined accuracy of the length of push cable displayed that takes into account the varying diameter of the turns of the push cable that are payed out of the push reel;

means for connecting the proximal end of the push cable and the distance sensing module so that the video overlay signal can be joined with video image signal from the camera head to provide an output video signal;

a video display unit for receiving the output video signal and displaying real time images of the interior of the pipe along with a visual indication of the length of push cable in the pipe; and means for conveying the output video signal from the distance sensing module to the video display unit.

21. A method of internally inspecting a pipe, comprising the steps of:

providing a video camera head including an optical sensor and means for generating a video image signal representing real time images of scenes in view of the optical sensor;

connecting the video camera head to a distal end of an elongate push cable having a predetermined resiliency and flexibility to permit the camera head to be forced down a substantial distance of a length of pipe;

storing the push cable in a plurality of turns in a push reel;

mounting the push reel for rotation on a support frame;

detecting an amount and direction of rotation of the push reel via a distance sensing module mounted on a the frame and generating a video overlay signal representing a length of the push cable that has been payed out of and/or reeled into the push reel and forced down the pipe;

communicating the video image signal from a proximal end of the push cable to the distance sensing module and joining the video image signal and the video overlay signal to provide an output video signal; and communicating the output video signal to a video display unit and displaying real time images of the inside of the pipe while simultaneously displaying a position of the video camera head inside the pipe representative of the length of the push cable that has been payed out of and/or reeled into the push reel.

22. The method of claim 21 and further comprising the step of applying a predetermined correction factor for ensuring a predetermined accuracy of the position displayed that takes into account parameters selected from the group consisting of the varying diameter of the turns of the push cable that are payed out of and/or reeled into the push reel, the diameter of the push reel, the length of the push cable and the diameter of the push cable.

23. The method of claim 21 and further comprising the step of displaying date and time information along with the real time images of the inside of the pipe and the position of the camera head in the pipe.

24. The method of claim 21 and further comprising the steps of programming customer information into the distance sensing module and displaying the customer information along with the real time images of the inside of the pipe and the position of the camera head.

25. The method of claim 21 wherein the distance sensing module detects the amount and direction of rotation of the push reel utilizing infrared radiation emitters and detectors that operate with infrared radiation modulated at a predetermined frequency to enhance noise rejection and provide improved edge discrimination.

26. The method of claim 21 wherein the distance sensing module detects the amount and direction of rotation of the push reel utilizing non-contact sensor pairs and a quadrature detection scheme.

27. The method of claim 21 wherein the video image signal is communicated from the proximal end of the push cable to the distance sensing module through an electromechanical connection through a hub of the push reel.

28. The method of claim 22 wherein the predetermined correction factor is applied by manually entering commands on a keyboard of the distance sensing module.

29. The method of claim 28 and further comprising the steps of performing a series of tests to determine whether the correction factor has been applied and displaying an error signal if the determination is negative.

30. The method of claim 21 and further comprising the steps of zeroing the displayed position for a selected location of the camera head in the pipe and displaying the distance that the camera head is thereafter moved from the selected location.

* * * * *